US012627969B2

(12) United States Patent
Naik et al.

(10) Patent No.: US 12,627,969 B2
(45) Date of Patent: May 12, 2026

(54) MULTI-LINK PROBING ENHANCEMENTS FOR MORE SEAMLESS ROAMING

(71) Applicant: QUALCOMM Incorporated, San Diego, CA (US)

(72) Inventors: Gaurang Naik, San Diego, CA (US); Abhishek Pramod Patil, San Diego, CA (US); Sai Yiu Duncan Ho, San Diego, CA (US); George Cherian, San Diego, CA (US); Alfred Asterjadhi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 194 days.

(21) Appl. No.: 18/500,734

(22) Filed: Nov. 2, 2023

(65) Prior Publication Data

US 2025/0150806 A1 May 8, 2025

(51) Int. Cl.
*H04W 8/18* (2009.01)
*H04W 76/15* (2018.01)

(52) U.S. Cl.
CPC .............. *H04W 8/18* (2013.01); *H04W 76/15* (2018.02)

(58) Field of Classification Search
CPC ........ H04W 8/18; H04W 84/12; H04W 76/15
See application file for complete search history.

(56) References Cited

U.S. PATENT DOCUMENTS

2023/0054755 A1* 2/2023 Patil ...................... H04W 76/15
2023/0232315 A1* 7/2023 Chitrakar .............. H04W 48/12
370/329

OTHER PUBLICATIONS

Chu L (NXP)., et al., "Smooth Roaming Follow Up", Doc.: IEEE 802.11-23/0632r0, IEEE Draft, 11-23-0632-00-0UHR-Smooth-Roaming-Follow-Up, IEEE-SA Mentor, Piscataway, NJ USA, vol. 802.11 UHR, May 17, 2023, pp. 1-12, Apr. 2, 2023, XP068203353, The Whole Document.

(Continued)

*Primary Examiner* — Jianye Wu
(74) *Attorney, Agent, or Firm* — Holland & Hart LLP

(57) ABSTRACT

This disclosure provides methods, components, devices and systems for multi-link probing enhancements for more seamless roaming. Some aspects more specifically relate to various formats of multi-link elements via which a non-access point (AP) multi-link device (MLD) may request the profile information associated with multiple AP MLDs and via which an AP MLD (or an AP affiliated with the AP MLD) may provide the requested profile information. In some examples, profile information associated with multiple AP MLDs may be requested or provided, or both, via a single multi-link element in accordance with one or more of the various formats. A non-AP MLD or an AP MLD may use such a single multi-link element to request or provide MLD-level information associated with the multiple AP MLDs or to request or provide link-level information associated with the multiple AP MLDs, or any combination thereof.

30 Claims, 12 Drawing Sheets

(56)             References Cited

OTHER PUBLICATIONS

"Draft Standard for Information Technology—Tele-Communications and Information Exchange Between Systems Local and Metropolitan Area Networks—Specific Requirements", Part 11: Wireless LAN Medium Access Control (MAC) and Physical Layer (PHY) Specifications, Amendment 8: Enhancements for Extremely High Throughput (EHT), 802.11 Working Group of the LAN/MAN Standards Committee of the IEEE Computer Society, Draft P802.11BE_D4.0, IEEE-SA, USA, vol. 802.11BE drafts, No. D4.0, Jul. 24, 2023, pp. 1-1031, XP068202699, pp. 247, 500.
International Search Report and Written Opinion—PCT/US2024/052103—ISA/EPO—Jan. 22, 2025.

* cited by examiner

[SSID 1]          [SSID 2]

ESS 2 ——————DS 2————————————————————————————

ESS 1 ——————DS 1—————————————————————————————

802-a          MLD A          MLD B          802-b          MLD C          802-c          MLD D          802-d

Channel 1 —————— BSSID-x
                        BSSID-y
                        806

Channel 2 —————— BSSID-p                              BSSID-q
                        BSSID-r
                        808

Channel 3 —————— BSSID-a          BSSID-c          BSSID-b 804-a          804-b          804-c

800

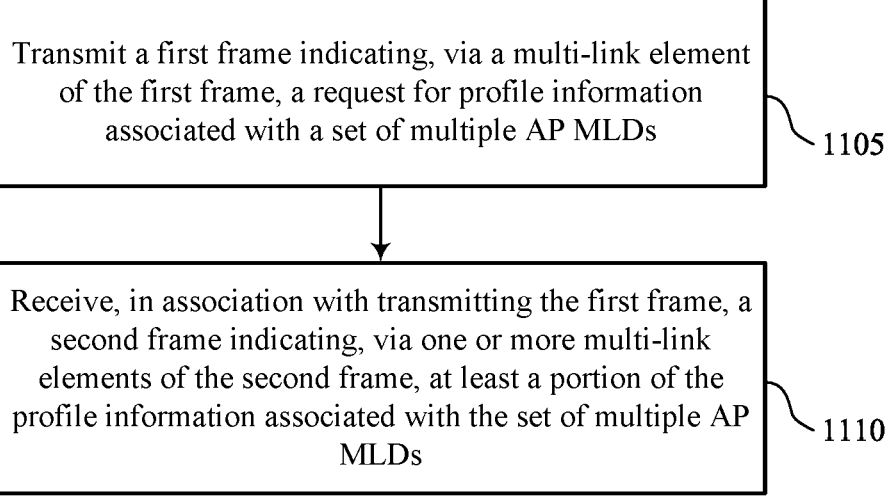

Transmit a first frame indicating, via a multi-link element of the first frame, a request for profile information associated with a set of multiple AP MLDs

1105

Receive, in association with transmitting the first frame, a second frame indicating, via one or more multi-link elements of the second frame, at least a portion of the profile information associated with the set of multiple AP MLDs

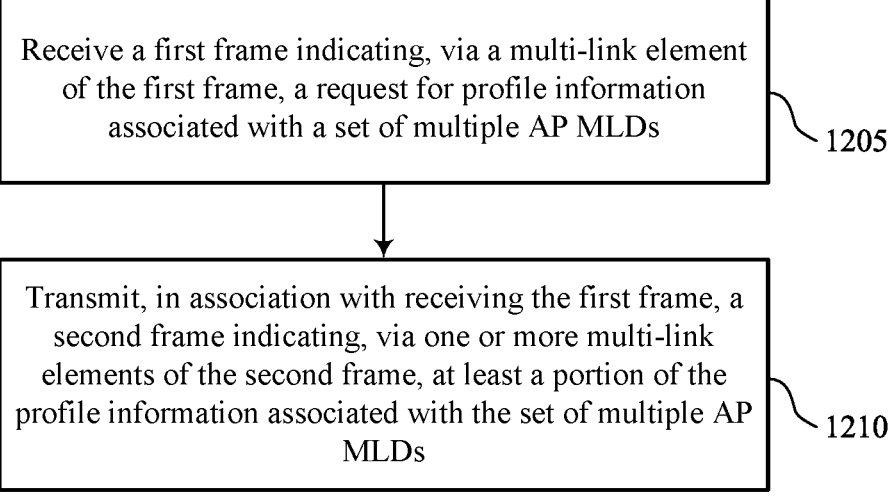

Receive a first frame indicating, via a multi-link element of the first frame, a request for profile information associated with a set of multiple AP MLDs

1205

Transmit, in association with receiving the first frame, a second frame indicating, via one or more multi-link elements of the second frame, at least a portion of the profile information associated with the set of multiple AP MLDs

MULTI-LINK PROBING ENHANCEMENTS FOR MORE SEAMLESS ROAMING

TECHNICAL FIELD

This disclosure relates to wireless communication and, more specifically, to multi-link probing enhancements for more seamless roaming.

DESCRIPTION OF THE RELATED TECHNOLOGY

A wireless local area network (WLAN) may be formed by one or more wireless access points (APs) that provide a shared wireless communication medium for use by multiple client devices also referred to as wireless stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

SUMMARY

The systems, methods, and devices of this disclosure each have several innovative aspects, no single one of which is solely responsible for the desirable attributes disclosed herein.

One innovative aspect of the subject matter described in this disclosure can be implemented in a wireless communication device. The wireless communication device may include a processing system that includes processor circuitry and memory circuitry that stores code. The processing system may be configured to cause the wireless communication device to transmit a first frame indicating, via a multi-link element of the first frame, a request for profile information associated with a set of multiple access point (AP) multi-link devices (MLDs) and receive, in association with transmitting the first frame, a second frame indicating, via one or more multi-link elements of the second frame, at least a portion of the profile information associated with the set of multiple AP MLDs.

Another innovative aspect of the subject matter described in this disclosure can be implemented in a method for wireless communication by a wireless communication device. The method may include transmitting a first frame indicating, via a multi-link element of the first frame, a request for profile information associated with a set of multiple AP MLDs and receiving, in association with transmitting the first frame, a second frame indicating, via one or more multi-link elements of the second frame, at least a portion of the profile information associated with the set of multiple AP MLDs.

Another innovative aspect of the subject matter described in this disclosure can be implemented in a wireless communication device. The wireless communication device may include means for transmitting a first frame indicating, via a multi-link element of the first frame, a request for profile information associated with a set of multiple AP MLDs and means for receiving, in association with transmitting the first frame, a second frame indicating, via one or more multi-link elements of the second frame, at least a portion of the profile information associated with the set of multiple AP MLDs.

Another innovative aspect of the subject matter described in this disclosure can be implemented in non-transitory computer-readable medium storing code for wireless communication at a wireless communication device. The code may include instructions executable by one or more processors to transmit a first frame indicating, via a multi-link element of the first frame, a request for profile information associated with a set of multiple AP MLDs and receive, in association with transmitting the first frame, a second frame indicating, via one or more multi-link elements of the second frame, at least a portion of the profile information associated with the set of multiple AP MLDs.

Some examples of the method, wireless communication devices, and non-transitory computer-readable medium described herein may further include operations, features, means, or instructions for including, in a link info field of the multi-link element of the first frame, a set of multiple per-MLD profile subelements associated with the set of multiple AP MLDs, where a presence of each respective per-MLD profile subelement of the set of multiple per-MLD profile subelements indicates a request for respective profile information associated with a respective AP MLD of the set of multiple AP MLDs.

In some examples of the method, wireless communication devices, and non-transitory computer-readable medium described herein, including the set of multiple per-MLD profile subelements in the link info field may include operations, features, means, or instructions for including a first per-MLD profile subelement associated with a first AP MLD in the link info field to indicate a request for first profile information associated with the first AP MLD, the first per-MLD profile subelement including at least a first MLD control field and a first MLD info field.

In some examples of the method, wireless communication devices, and non-transitory computer-readable medium described herein, the first MLD control field includes a first AP MLD identifier subfield identifying the first AP MLD.

In some examples of the method, wireless communication devices, and non-transitory computer-readable medium described herein, a first MLD profile field of the first per-MLD profile subelement includes one or more first per-station (STA) profile subelements or may be absent of first per-STA profile subelements, inclusion of the one or more first per-STA profile subelements in the first MLD profile field indicates a request for STA-specific profile information associated with each of one or more first APs affiliated with the first AP MLD that may be identified by the one or more first per-STA profile subelements, and absence of the first per-STA profile subelements from the first MLD profile field indicates a request for STA-specific profile information associated with all APs affiliated with the first AP MLD.

Another innovative aspect of the subject matter described in this disclosure can be implemented in a wireless communication device. The wireless communication device may include a processing system that includes processor circuitry and memory circuitry that stores code. The processing system may be configured to cause the wireless communication device to receive a first frame indicating, via a multi-link element of the first frame, a request for profile information associated with a set of multiple AP MLDs and transmit, in association with receiving the first frame, a second frame indicating, via one or more multi-link elements of the second frame, at least a portion of the profile information associated with the set of multiple AP MLDs.

Another innovative aspect of the subject matter described in this disclosure can be implemented in a method for wireless communication by a wireless communication device. The method may include receiving a first frame indicating, via a multi-link element of the first frame, a request for profile information associated with a set of multiple AP MLDs and transmitting, in association with receiving the first frame, a second frame indicating, via one or more multi-link elements of the second frame, at least a portion of the profile information associated with the set of multiple AP MLDs.

Another innovative aspect of the subject matter described in this disclosure can be implemented in a wireless communication device. The wireless communication device may include means for receiving a first frame indicating, via a multi-link element of the first frame, a request for profile information associated with a set of multiple AP MLDs and means for transmitting, in association with receiving the first frame, a second frame indicating, via one or more multi-link elements of the second frame, at least a portion of the profile information associated with the set of multiple AP MLDs.

Another innovative aspect of the subject matter described in this disclosure can be implemented in non-transitory computer-readable medium storing code for wireless communication at a wireless communication device. The code may include instructions executable by a processor to receive a first frame indicating, via a multi-link element of the first frame, a request for profile information associated with a set of multiple AP MLDs and transmit, in association with receiving the first frame, a second frame indicating, via one or more multi-link elements of the second frame, at least a portion of the profile information associated with the set of multiple AP MLDs.

In some examples of the method, wireless communication devices, and non-transitory computer-readable medium described herein, transmitting at least the portion of the profile information associated with the set of multiple AP MLDs may include operations, features, means, or instructions for transmitting, via a link info field of a second multi-link element of the second frame, a set of multiple per-MLD profile subelements associated with the set of multiple AP MLDs, where each respective per-MLD profile subelement of the set of multiple per-MLD profile subelements provides respective profile information associated with a respective AP MLD of the set of multiple AP MLDs, and where the one or more multi-link elements of the second frame include the second multi-link element.

In some examples of the method, wireless communication devices, and non-transitory computer-readable medium described herein, the link info field of the second multi-link element includes a first per-MLD profile subelement providing first profile information associated with a first AP MLD of the set of multiple AP MLDs, the first per-MLD profile subelement including at least a first MLD control field and a first MLD info field.

In some examples of the method, wireless communication devices, and non-transitory computer-readable medium described herein, the first MLD control field includes a first AP MLD identifier subfield identifying the first AP MLD, and the first MLD info field includes first MLD-level common information associated with the first AP MLD.

In some examples of the method, wireless communication devices, and non-transitory computer-readable medium described herein, a first MLD profile field of the first per-MLD profile subelement includes one or more first per-STA profile subelements, each first per-STA profile subelement of the one or more first per-STA profile subelements providing respective profile information associated with a respective AP affiliated with the first AP MLD.

In some examples of the method, wireless communication devices, and non-transitory computer-readable medium described herein, transmitting at least the portion of the profile information associated with the set of multiple AP MLDs may include operations, features, means, or instructions for transmitting, via the link info field of the multi-link element of the first frame, a set of multiple per-STA profile subelements associated with the set of multiple AP MLDs, where each respective per-STA profile subelement of the set of multiple per-STA profile subelements provides respective profile information associated with a respective AP affiliated with a respective AP MLD of the set of multiple AP MLDs.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIGS. 11 and 12 show flowcharts illustrating example processes performable by or at a wireless communication device that supports multi-link probing enhancements for more seamless roaming.

Like reference numbers and designations in the various drawings indicate like elements.

DETAILED DESCRIPTION

Figure 1:
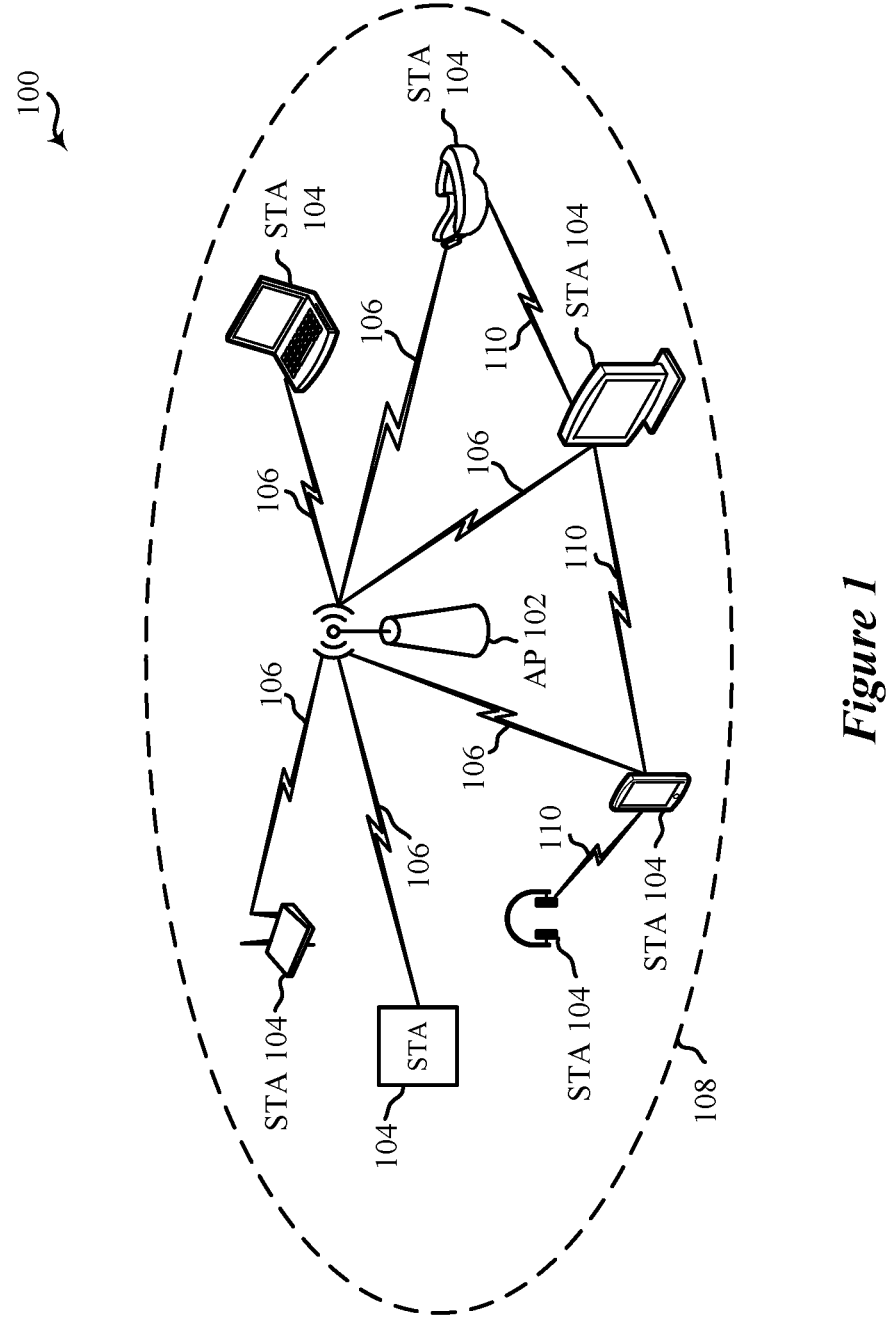
FIG. 1 shows a pictorial diagram of an example wireless communication network.

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described examples can be implemented in any device, system or network that is capable of transmitting and receiving RF signals according to one or more of the following technologies or techniques: code division multiple access (CDMA), time division multiple access (TDMA), orthogonal frequency division multiplexing (OFDM), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO (MU-MIMO). The described examples also can be implemented using other wireless communication protocols or RF signals suitable for use in one or more of a wireless personal area network (WPAN), a wireless local area network (WLAN), a wireless wide area network (WWAN), a wireless metropolitan area network (WMAN), or an internet of things (IoT) network.

Various aspects relate generally to signaling mechanisms according to which a non-access point (AP) multi-link device (MLD) may request profile information associated with multiple AP MLDs and according to which an AP MLD (or an AP affiliated with an AP MLD) may provide the requested profile information to the non-AP MLD. Some aspects more specifically relate to various formats of multi-link elements via which the non-AP MLD may request the profile information associated with the multiple AP MLDs and via which the AP MLD (or the AP affiliated with the AP MLD) may provide the requested profile information. In some examples, profile information associated with multiple AP MLDs may be requested or provided, or both, via a single multi-link element in accordance with one or more of the various formats. A non-AP MLD or an AP MLD may use such a single multi-link element to request or provide MLD-level information associated with the multiple AP MLDs or to request or provide link-level information associated with the multiple AP MLDs, or any combination thereof. Further, some aspects relate to how an AP MLD (or an AP affiliated with an AP MLD) may convey requested profile information associated with multiple AP MLDs via multiple frames and how a request for profile information associated with multiple AP MLDs relates to deployments in which the requested AP MLDs are associated with a multiple basic service set (BSS) (MBSS) identifier (ID) (MBSSID) set.

Particular aspects of the subject matter described in this disclosure can be implemented to realize one or more of the following potential advantages. In some examples, by enabling wireless communication devices (such as a non-AP MLD and an AP MLD) to request or provide profile information associated with multiple AP MLDs via a multi-link element (such as a single multi-link element), the described techniques can be used to reduce signaling overhead because the use of a single multi-link element may consume less space in one or more frame transmissions, allowing for smaller frame transmissions or an inclusion of additional information in the frame transmissions, or both. In accordance with such reduced signaling overhead or such an inclusion of additional information because of the use of a single multi-link element, the described techniques can be used to realize greater spectral efficiency, higher data rates, and greater system capacity. Further, by enabling various types of multi-link formats and enabling an AP MLD the flexibility to provide requested profile information via one or more frames, the described techniques may support compatibility with various types of wireless communication devices (such as wireless communication devices of varying capabilities) and may provide more flexibility in some systems, which may result in more reliable communication and power savings for both AP MLDs and non-AP MLDs.

Further, in scenarios in which a non-AP MLD (or any client device) is or may soon be roaming (or be in a roaming mode), the non-AP MLD may transmit a frame including the described multi-link element to solicit information of multiple AP MLDs, which the non-AP MLD may use to select an AP MLD with which to establish a connection (such as switch association). Thus, a non-AP MLD may transmit a frame including the described multi-link element whenever the non-AP MLD roams away (such as begins to roam away, or in accordance with determining that the non-AP MLD may soon roam away) from a serving AP MLD. Roaming may occur relatively frequently in some systems, resulting in greater overhead reduction over time (as the overhead reduction achieved by the described techniques may compound with each request by a non-AP MLD). Moreover, in deployment scenarios including multiple potentially roaming non-AP MLDs (such as multiple clients), each of such multiple non-AP MLDs may transmit frames including the described multi-link element to request information of multiple AP MLDs, such that the overhead reduction achieved by the described techniques becomes multiplicative for each potentially roaming non-AP MLD (which may be a relatively large number in some systems). Accordingly, the overhead benefits (among other benefits) that the described techniques provide may compound or increase as a frequency of requests increases and as a quantity of potentially roaming non-AP MLDs increases, which may provide robust network scalability.

FIG. 1 shows a pictorial diagram of an example wireless communication network 100. According to some aspects, the wireless communication network 100 can be an example of a wireless local area network (WLAN) such as a Wi-Fi network. For example, the wireless communication network 100 can be a network implementing at least one of the IEEE 802.11 family of wireless communication protocol standards (such as defined by the IEEE 802.11-2020 specification or amendments thereof including, but not limited to, 802.11ay, 802.11ax, 802.11az, 802.11ba, 802.11 bd, 802.11be, 802.11bf, and 802.11bn). In some other examples, the wireless communication network 100 can be an example of a cellular radio access network (RAN), such as a 5G or 6G RAN that implements one or more cellular protocols such as those specified in one or more 3GPP standards. In some other examples, the wireless communication network 100 can include a WLAN that functions in an interoperable or converged manner with one or more cellular RANs to provide greater or enhanced network coverage to wireless communication devices within the wireless communication network 100 or to enable such devices to connect to a cellular network's core, such as to access the network management capabilities and functionality offered by the cellular network core.

The wireless communication network 100 may include numerous wireless communication devices including at least one wireless access point (AP) 102 and any number of wireless stations (STAs) 104. While only one AP 102 is shown in FIG. 1, the wireless communication network 100 can include multiple APs 102. The AP 102 can be or represent various different types of network entities including, but not limited to, a home networking AP, an enterprise-level AP, a single-frequency AP, a dual-band simultaneous (DBS) AP, a tri-band simultaneous (TBS) AP, a standalone AP, a non-standalone AP, a software-enabled AP (soft AP), and a multi-link AP (also referred to as an AP multi-link device (MLD)), as well as cellular (such as 3GPP, 4G LTE, 5G or 6G) base stations or other cellular network nodes such as a Node B, an evolved Node B (eNB), a gNB, a transmission reception point (TRP) or another type of device or equipment included in a radio access network (RAN), including Open-RAN (O-RAN) network entities, such as a central unit (CU), a distributed unit (DU) or a radio unit (RU).

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, other handheld or wearable communication devices, netbooks, notebook computers, tablet computers, laptops, Chromebooks, augmented reality (AR), virtual reality (VR), mixed reality (MR) or extended reality (XR) wireless headsets or other peripheral devices, wireless earbuds, other wearable devices, display devices (such as TVs, computer monitors or video gaming consoles), video game controllers, navigation systems, music or other audio or stereo devices, remote control devices, printers, kitchen appliances (including smart refrigerators) or other household appliances, key fobs (such as for passive keyless entry and start (PKES) systems), Internet of Things (IoT) devices, and vehicles, among other examples.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the wireless communication network 100. The BSS may be identified by STAs 104 and other devices by a service set identifier (SSID), as well as a basic service set identifier (BSSID), which may be a medium access control (MAC) address of the AP 102. The AP 102 may periodically broadcast beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification or indication of a primary channel used by the respective AP 102 as well as a timing synchronization function (TSF) for establishing or maintaining timing synchronization with the AP 102. The AP 102 may provide access to external networks to various STAs 104 in the wireless communication network 100 via respective communication links 106.

To establish a communication link 106 with an AP 102, each of the STAs 104 is configured to perform passive or active scanning operations ("scans") on frequency channels in one or more frequency bands (such as the 2.4 GHZ, 5 GHZ, 6 GHz, 45 GHZ, or 60 GHz bands). To perform passive scanning, a STA 104 listens for beacons, which are transmitted by respective APs 102 at periodic time intervals referred to as target beacon transmission times (TBTTs). To perform active scanning, a STA 104 generates and sequentially transmits probe requests on each channel to be scanned and listens for probe responses from APs 102. Each STA 104 may identify, determine, ascertain, or select an AP 102 with which to associate in accordance with the scanning information obtained through the passive or active scans, and to perform authentication and association operations to establish a communication link 106 with the selected AP 102. The selected AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA 104 or to select among multiple APs 102 that together form an extended service set (ESS) including multiple connected BSSs. For example, the wireless communication network 100 may be connected to a wired or wireless distribution system that may enable multiple APs 102 to be connected in such an ESS. As such, a STA 104 can be covered by more than one AP 102 and can associate with different APs 102 at different times for different transmissions. Additionally, after association with an AP 102, a STA 104 also may periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some examples, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some examples, ad hoc networks may be implemented within a larger network such as the wireless communication network 100. In such examples, while the STAs 104 may be capable of communicating with each other through the AP 102 using communication links 106, STAs 104 also can communicate directly with each other via direct wireless communication links 110. Additionally, two STAs 104 may communicate via a direct wireless communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless communication links 110 include Wi-Fi Direct connections, connections established by using a Wi-Fi Tunneled Direct Link Setup (TDLS) link, and other P2P group connections.

In some networks, the AP 102 or the STAs 104, or both, may support applications associated with high throughput or low-latency requirements, or may provide lossless audio to one or more other devices. For example, the AP 102 or the STAs 104 may support applications and use cases associated with ultra-low-latency (ULL), such as ULL gaming, or streaming lossless audio and video to one or more personal audio devices (such as peripheral devices) or AR/VR/MR/ XR headset devices. In scenarios in which a user uses two or more peripheral devices, the AP 102 or the STAs 104 may support an extended personal audio network enabling communication with the two or more peripheral devices. Additionally, the AP 102 and STAs 104 may support additional ULL applications such as cloud-based applications (such as VR cloud gaming) that have ULL and high throughput requirements.

As indicated above, in some implementations, the AP 102 and the STAs 104 may function and communicate (via the respective communication links 106) according to one or more of the IEEE 802.11 family of wireless communication protocol standards. These standards define the WLAN radio and baseband protocols for the physical (PHY) and MAC layers. The AP 102 and STAs 104 transmit and receive wireless communications (hereinafter also referred to as "Wi-Fi communications" or "wireless packets") to and from one another in the form of PHY protocol data units (PPDUs).

Each PPDU is a composite structure that includes a PHY preamble and a payload that is in the form of a PHY service data unit (PSDU). The information provided in the preamble may be used by a receiving device to decode the subsequent data in the PSDU. In instances in which a PPDU is transmitted over a bonded or wideband channel, the preamble fields may be duplicated and transmitted in each of multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is associated with the particular IEEE 802.11 wireless communication protocol to be used to transmit the payload.

The APs 102 and STAs 104 in the wireless communication network 100 may transmit PPDUs over an unlicensed spectrum, which may be a portion of spectrum that includes frequency bands traditionally used by Wi-Fi technology, such as the 2.4 GHZ, 5 GHz, 6 GHZ, 45 GHZ, and 60 GHz bands. Some examples of the APs 102 and STAs 104 described herein also may communicate in other frequency bands that may support licensed or unlicensed communications. For example, the APs 102 or STAs 104, or both, also may be capable of communicating over licensed operating bands, where multiple operators may have respective licenses to operate in the same or overlapping frequency ranges. Such licensed operating bands may map to or be associated with frequency range designations of FR1 (410 MHZ-7.125 GHZ), FR2 (24.25 GHZ-52.6 GHZ), FR3 (7.125 GHZ-24.25 GHZ), FR4a or FR4-1 (52.6 GHz-71 GHZ), FR4 (52.6 GHZ-114.25 GHZ), and FR5 (114.25 GHZ-300 GHz).

Each of the frequency bands may include multiple sub-bands and frequency channels (also referred to as subchannels). For example, PPDUs conforming to the IEEE 802.11n, 802.11ac, 802.11ax, 802.11be and 802.11bn standard amendments may be transmitted over one or more of the 2.4 GHZ, 5 GHZ, or 6 GHz bands, each of which is divided into multiple 20 MHz channels. As such, these PPDUs are transmitted over a physical channel having a minimum bandwidth of 20 MHZ, but larger channels can be formed through channel bonding. For example, PPDUs may be transmitted over physical channels having bandwidths of 40 MHZ, 80 MHZ, 160 MHZ, 240 MHZ. 320 MHz, 480 MHZ, or 640 MHz by bonding together multiple 20 MHz channels.

Some wireless communication devices (including both APs and STAs such as, for example, AP 102 and STAs 104 described with reference to FIG. 1) are capable of multi-link operation (MLO). In some examples, MLO supports establishing multiple different communication links (such as a first link on the 2.4 GHz band, a second link on the 5 GHz band, and the third link on the 6 GHz band) between the STA 104 and the AP 102 and exchanging packets on one or more communications links concurrently and dynamically. Each communication link may support one or more sets of channels or logical entities. In some examples, each communication link associated with a given wireless communication device may be associated with a respective radio of the wireless communication device, which may include one or more transmit/receive (Tx/Rx) chains, include or be coupled with one or more physical antennas, or include signal processing components, among other components. An MLO-capable device may be referred to as a multi-link device (MLD). An MLD may include a single upper MAC layer, and can include, for example, three independent lower MAC layers and three associated independent PHY layers for respective links in the 2.4 GHZ, 5 GHZ, and 6 GHz bands. This architecture may enable a single association process and security context. An AP MLD may include multiple APs each configured to communicate on a respective communication link with a respective one of multiple STAs 104 of a non-AP MLD (also referred to as a "STA MLD"). The STA MLD may communicate with the AP MLD over one or more of the multiple communication links at a given time. MLDs may independently contend for access on each of the communication links, which achieves latency reduction by enabling the MLD to transmit its packets on the first communication link that becomes available.

Another feature of MLO is Traffic Steering and QoS characterization, which achieves latency reduction and other QoS enhancements by mapping traffic flows having different latency or other requirements to different links. For example, traffic with low latency requirements can be mapped to wireless links operating in the 6 GHz band and more latency-tolerant flows can be mapped to wireless links operating in the 2.4 GHz or 5 GHz bands.

One type of MLO is alternating multi-link, in which a MLD may listen to two different high performance channels at the same time. When an MLD has traffic to send, it may use the first channel with an access opportunity (such as TXOP). While the MLD may only use one channel to receive or transmit at a time, having access opportunities in two different channels provides low latency when networks are congested.

Another type of MLO is multi-link aggregation (MLA), where traffic associated with a single STA 104 is simultaneously transmitted across multiple communication links in parallel to maximize the utilization of available resources to achieve higher throughput. This is akin to carrier aggregation in the cellular space. That is, during at least some duration of time, transmissions or portions of transmissions may occur over two or more links in parallel at the same time. In some examples, the parallel wireless communication links may support synchronized transmissions. In some other examples, or during some other durations of time, transmissions over the links may be parallel, but not be synchronized or concurrent. In some examples or durations of time, two or more of the links may be used for communications between the wireless communication devices in the same direction (such as all uplink or all downlink). In some other examples or durations of time, two or more of the links may be used for communications in different directions. For example, one or more links may support uplink communications and one or more links may support downlink communications. In such examples, at least one of the wireless communication devices operates in a full duplex mode. Generally, full duplex operation enables bi-directional communications where at least one of the wireless communication devices may transmit and receive at the same time.

MLA may be implemented in a number of ways. In some examples, MLA may be packet-based. For packet-based aggregation, frames of a single traffic flow (such as all traffic associated with a given traffic identifier (TID)) may be sent concurrently across multiple communication links. In some other examples, MLA may be flow-based. For flow-based aggregation, each traffic flow (such as all traffic associated with a given TID) may be sent using a single one of multiple available communication links. As an example, a single STA MLD may access a web browser while streaming a video in parallel. The traffic associated with the web browser access may be communicated over a first communication link while the traffic associated with the video stream may be communicated over a second communication link in parallel (such that at least some of the data may be transmitted on the first channel concurrently with data transmitted on the second channel).

In some other examples, MLA may be implemented as a hybrid of flow-based and packet-based aggregation. For example, an MLD may employ flow-based aggregation in situations in which multiple traffic flows are created and may employ packet-based aggregation in other situations. The determination to switch among the MLA techniques or modes may additionally or alternatively be associated with other metrics (such as a time of day, traffic load within the network, or battery power for a wireless communication device, among other factors or considerations).

To support MLO techniques, an AP MLD and a STA MLD may exchange supported MLO capability information (such as supported aggregation type or supported frequency bands, among other information). In some examples, the exchange of information may occur via a beacon signal, a probe request or probe response, an association request or an association response frame, a dedicated action frame, or an operating mode indicator (OMI), among other examples. In some examples, an AP MLD may designate a given channel in a given band as an anchor channel (such as the channel on which it transmits beacons and other management frames). In such examples, the AP MLD also may transmit beacons (such as ones which may contain less information) on other channels for discovery purposes.

MLO techniques may provide multiple benefits to a wireless communication network 100. For example, MLO may improve user perceived throughput (UPT) (such as by quickly flushing per-user transmit queues). Similarly, MLO may improve throughput by improving utilization of available channels and may increase spectral utilization (such as increasing the bandwidth-time product). Further, MLO may enable smooth transitions between multi-band radios (such as where each radio may be associated with a given RF band) or enable a framework to set up separation of control channels and data channels. Other benefits of MLO include reducing the ON time of a modem, which may benefit a wireless communication device in terms of power consumption. Another benefit of MLO is the increased multiplexing opportunities in the case of a single BSS. For example, multi-link aggregation may increase the number of users per multiplexed transmission served by the multi-link AP MLD.

Figure 2:
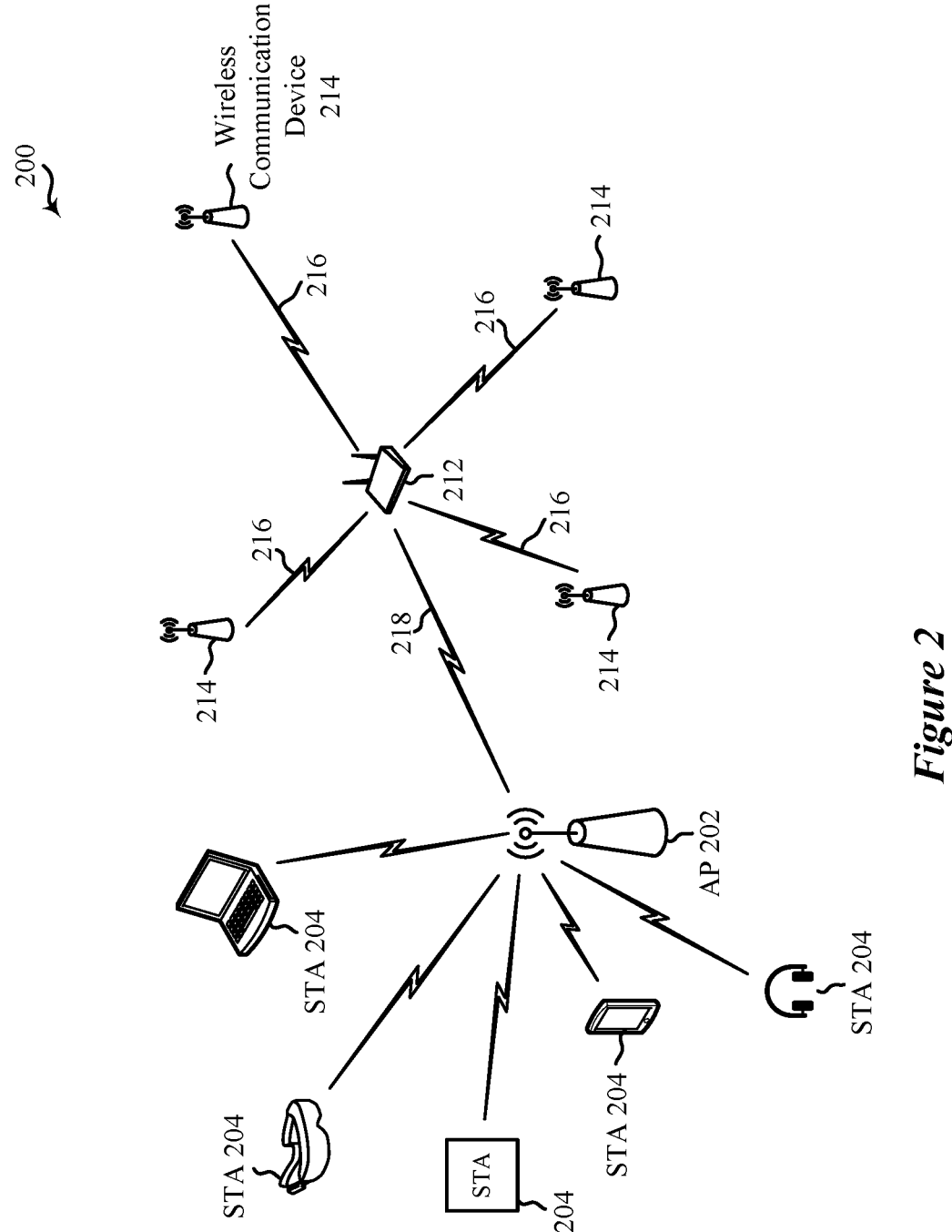
FIG. 2 shows a pictorial diagram of another example wireless communication network.

FIG. 2 shows a pictorial diagram of another example wireless communication network 200. According to some aspects, the wireless communication network 200 can be an example of a mesh network, an IoT network or a sensor network in accordance with one or more of the IEEE 802.11 family of wireless communication protocol standards (including the 802.11ah amendment). The wireless communication network 200 may include multiple wireless communication devices 214. The wireless communication devices 214 may represent various devices such as display devices (such as TVs, computer monitors, navigation systems, among others), music or other audio or stereo devices, remote control devices ("remotes"), printers, kitchen or other household appliances, among other examples.

In some examples, the wireless communication devices 214 sense, measure, collect or otherwise obtain and process data and then transmit such raw or processed data to an intermediate device 212 for subsequent processing or distribution. Additionally, or alternatively, the intermediate device 212 may transmit control information, digital content (such as audio or video data), configuration information or other instructions to the wireless communication devices 214. The intermediate device 212 and the wireless communication devices 214 can communicate with one another via wireless communication links 216. In some examples, the wireless communication links 216 include Bluetooth links or other personal area network (PAN) or short-range communication links.

In some examples, the intermediate device 212 also may be configured for wireless communication with other networks such as with a wireless communication network 100 (such as a Wi-Fi network) or a wireless (such as cellular) wide area network (WWAN), which may, in turn, provide access to external networks including the Internet. For example, the intermediate device 212 may associate and communicate, over a Wi-Fi link 218, with an AP 102 of a WLAN network, which also may serve various STAs 104. In some examples, the intermediate device 212 is an example of a network gateway, for example, an IoT gateway. In such a manner, the intermediate device 212 may serve as an edge network bridge providing a Wi-Fi core backhaul for the IoT network including the wireless communication devices 214. In some examples, the intermediate device 212 can analyze, preprocess and aggregate data received from the wireless communication devices 214 locally at the edge before transmitting it to other devices or external networks via the Wi-Fi link 218. The intermediate device 212 also can provide additional security for the IoT network and the data it transports.

Figure 3:
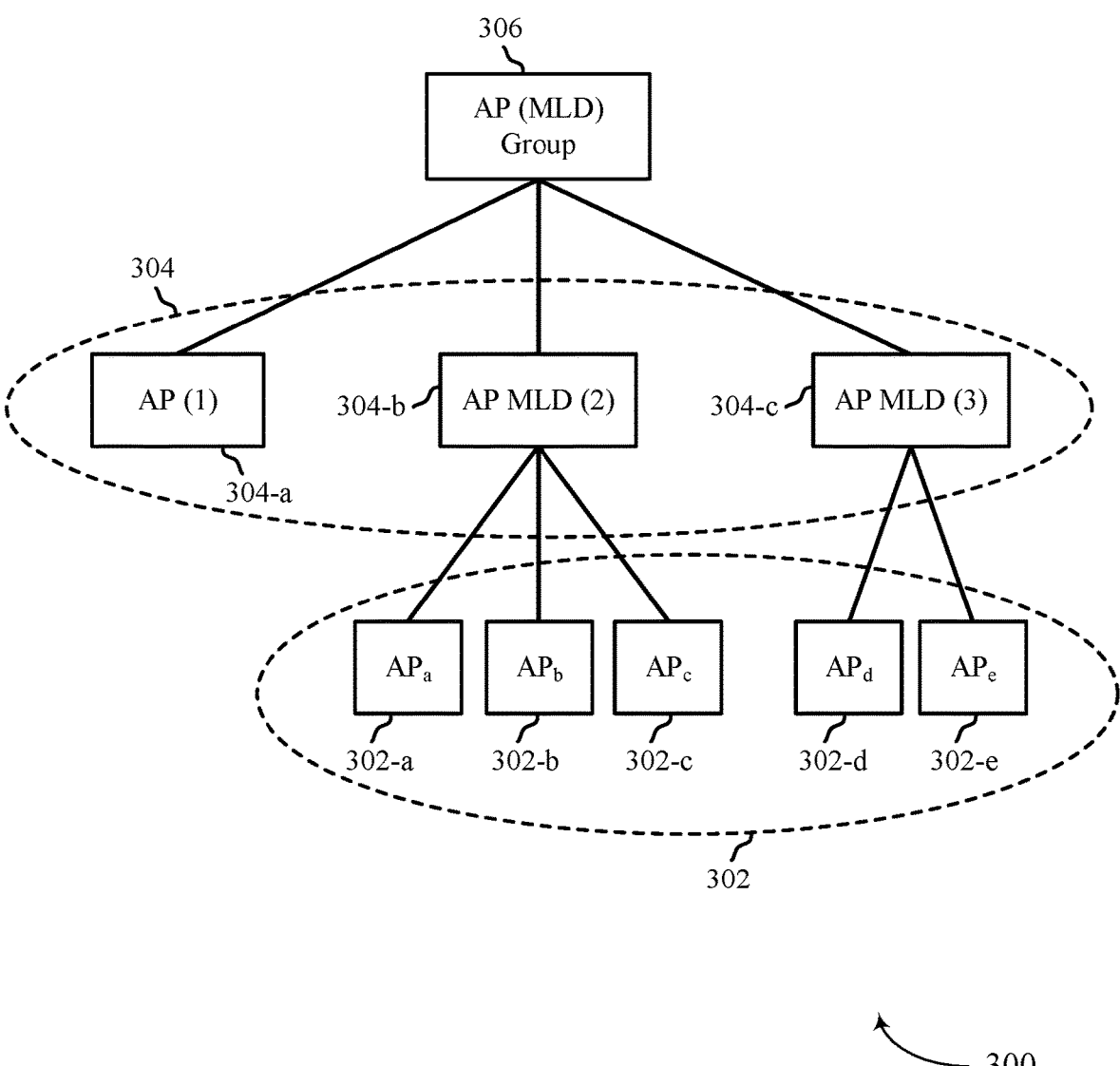
FIG. 3 shows an example hierarchical structure associated with a grouping of access points (APs) that supports multi-link probing enhancements for more seamless roaming.

FIG. 3 shows an example hierarchical relationship 300 associated with a grouping of APs that supports multi-link probing enhancements for more seamless roaming. The hierarchical relationship 300 may implement or be implemented to realize aspects of the wireless communication network 100 and the wireless communication network 200. For example, the hierarchical relationship 300 illustrates an AP (MLD) group 306 of multiple APs 304, which may refer individually or collectively to any one or more of an AP 304-a, an AP MLD 304-b, and an AP MLD 304-c. In other words, the AP (MLD) group 306 may include multiple affiliated APs 304, with any one or more of the affiliated APs 304 being a non-MLD AP (such as a standalone AP, such as the AP 304-a) or an AP MLD with its own affiliated APs (such as the AP MLD 304-b and the AP MLD 304-c).

For example, the AP MLD 304-b may have an affiliated AP 302-a, an affiliated AP 302-b, and an affiliated AP 302-c and the AP MLD 304-c may have an affiliated AP 302-d and an affiliated AP 302-e. Any one or more of the APs 304 or the APs 302 may be an example of an AP 102 or an AP 202 as illustrated by and described with reference to FIGS. 1 and 2. In some aspects, the APs 304 may be understood as being affiliated with the AP (MLD) group 306, as either AP MLDs or non-MLD APs. An AP 302 (such as any one or more of the affiliated AP 302-a, the affiliated AP 302-b, the affiliated AP 302-c, the affiliated AP 302-d, and the affiliated AP 302-e) affiliated with an AP MLD (such as the AP MLD 304-b or the AP MLD 304-c) may be understood as being (indirectly) affiliated with the AP (MLD) group 306.

In some implementations, an AP MLD identifier (ID) may be locally assigned by a reporting AP MLD. A reporting AP may identify its affiliated AP MLD with an AP MLD ID set equal to ( ) and, if an AP belongs to a multiple BSSID set, an AP MLD of an AP corresponding to a nontransmitted BSSID (nonTxBSSID) may be identified by a BSSID index of the nontransmitted BSSID. Other AP MLDs may be identified by a unique integer value such that an AP MLD ID is greater than 0 and is less than 255 (such as >0) && <255) for a non-multiple BSSID set and an AP MLD ID is greater than a threshold value (such as n−1) and is less than 255 (such as >n−1 && <255). Alternatively, if a reporting AP does not have information of a reported AP MLD, the AP MLD ID for that reported AP MLD may be set to 255.

In some implementations, such AP identifying mechanisms may be extended to the AP (MLD) group 306, such that each AP 304 affiliated with the AP (MLD) group 306 may assign locally unique AP MLD IDs to other APs 304 that are affiliated with the same AP (MLD) group 306. Alternatively, in some other implementations, a device associated with the AP (MLD) group 306 (such as a centralized controller device) may designate a unique AP MLD ID to each AP 304 that is affiliated with the AP (MLD) group 306. In such implementations, an AP 304 may be identified by the same AP MLD ID when reported by an affiliated AP 302 of another AP 304.

In some networks, various wireless communication devices may roam between APs 304 and, in such networks, facilitating seamless roaming may be a key performance goal. In some of such networks, for example, a client device may expect or be able to seamlessly move from one serving AP to another serving AP without performing a re-association procedure. In such networks, an AP 304 may be expected to provide information related to the AP (MLD) group 306, advertise candidate APs 304 for the client device to select for roaming, and optionally transfer context between APs 304.

In some systems, one or more wireless communication devices (such as APs or STAs 104) may use a basic multi-link element to carry STA-specific information (such as information associated with a particular AP 302) within a link info field of the basic multi-link element and MLD-level common information (such as information associated with the AP 304-*b* or the AP 304-*c*) within a common info field of the basic multi-link element. Such a basic multi-link element, however, may be configured to provide information associated with a single AP 304, which may be insufficient in deployment scenarios in which a seamless roaming procedure necessitates requesting and providing information of multiple APs 304 (such as multiple AP MLDs) at a same time (such as via a same frame). To address these expectations associated with seamless roaming, some wireless communication devices may include multiple basic (or probe request) multi-link elements within a single frame. Each of the multiple basic multi-link elements (which may be equivalently referred to as basic ML information elements (IEs)) may carry MLD-level common information (such as MLD capabilities, enhanced multi-link (EML) capabilities, or an MLD medium access control (MAC) address) and information of the STAs (such as APs) affiliated with that MLD. Likewise, each probe request multi-link element may carry an ID of an AP MLD whose information is solicited. Including multiple basic or probe request multi-link elements in a frame, however, may result in high signaling overhead and poor spectral efficiency, as including multiple basic or probe request multi-link elements within a single frame may significantly increase the size of a probe request frame or a probe response frame, or both.

In some implementations of the present disclosure, wireless communication devices (such as STAs or APs) may support a variant of a multi-link element having a format associated with more efficiently requesting or providing, or both, information associated with multiple APs 304 (such as multiple AP MLDs). Within such a multi-link element, a common info field may carry the AP (MLD) group 306 specific common information. Such AP (MLD) group 306 specific common information may include information indicative of a quantity of APs 304 in the AP (MLD) group 306 and information indicative of delays associated with roaming, among other information that is common across or equally applicable to the APs 304 within the AP (MLD) group 306. Further, within such a multi-link element, a link info field (which may be referred to as an MLD/link info field) may include one or more per-MLD profile subelements, each per-MLD profile subelement providing information associated with a corresponding AP MLD.

In some implementations, to carry information associated with the links of an MLD, both per-STA profile subelements and per-MLD profile subelements may be included in the link info field of the multi-link element. In such implementations, an MLD ID subfield inside a STA info field may identify the MLD with which a corresponding STA is affiliated. Accordingly, in such implementations, if a reporting AP provides information of two MLDs each having two links, the link info field of the multi-link element may include two per-MLD profile subelements and four per-STA (such as per-link) profile subelements. Additionally, or alternatively, to carry information associated with the links of an MLD, each per-MLD profile subelement may include one or more per-STA profile subelements to carry information associated with the STAs (such as APs) affiliated with that MLD. A benefit of such implementations may include simplification of parsing rules when the multi-link element in which the per-MLD profiles and per-STA profiles are carried is fragmented (as, if the multi-link element is fragmented across multiple frames, STA-level information corresponding to a given MLD may stay together and not get separated across the multiple frames).

In accordance with including multiple per-MLD profile subelements within the link info field of the multi-link element, wireless communication devices may support backward compatibility with other wireless communication devices within a given wireless network. For example, wireless communication devices (such as somewhat less capable wireless communication devices, such as wireless communication devices associated with the 802.11be generation of network specifications) may parse subelement IDs and may recognize per-MLD profile subelements as an unknown subelement. In such scenarios, such wireless communication devices may ignore the subelement and continue parsing a remainder of the frame (as applicable).

Figure 4:
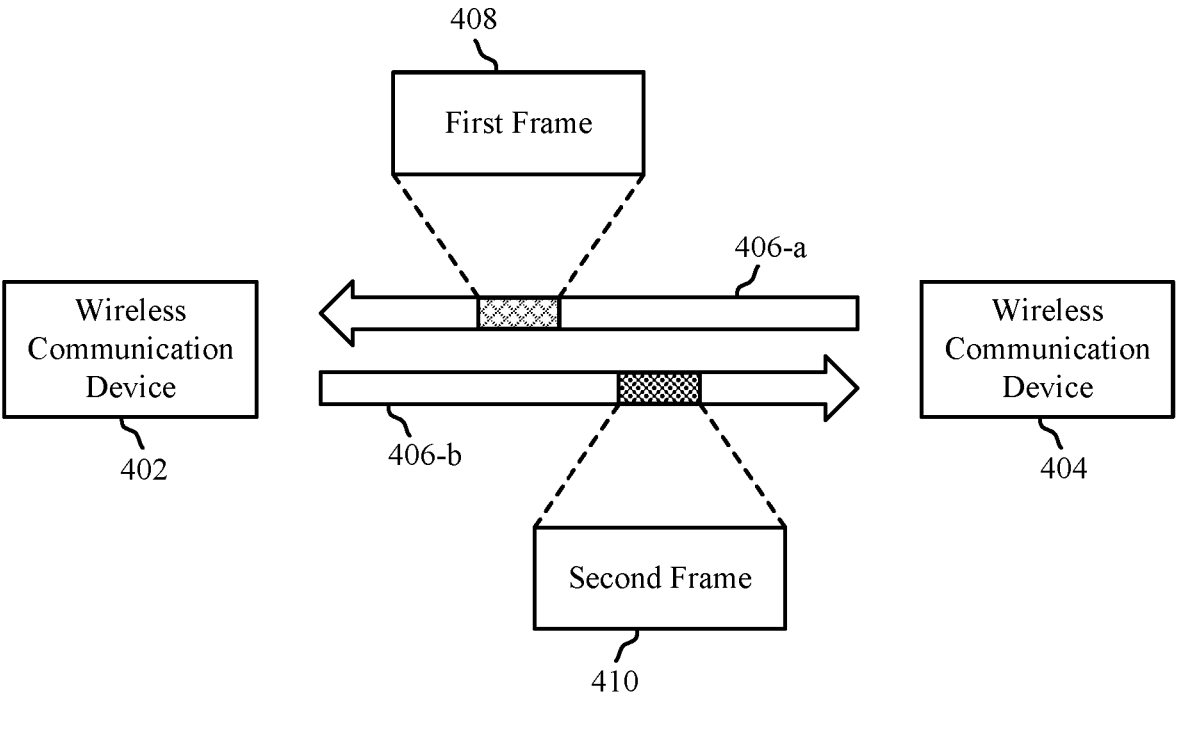
FIG. 4 shows an example signaling diagram that supports multi-link probing enhancements for more seamless roaming.

FIG. 4 shows an example signaling diagram 400 that supports multi-link probing enhancements for more seamless roaming. The signaling diagram 400 may implement or be implemented to realize aspects of the wireless communication network 100, the wireless communication network 200, or the hierarchical relationship 300. For example, the signaling diagram 400 illustrates communication between a wireless communication device 402 and a wireless communication device 404, which may be examples of corresponding devices as illustrated and described herein. For example, the wireless communication device 402 may be an example of an AP, such as an AP 102, an AP 202, an AP 302, or an AP 304 as illustrated by and described with reference to FIGS. 1-3. The wireless communication device 404 may be an example of a STA, such as a non-AP MLD, such as a STA 104 or a STA 204 as illustrated by and described with reference to FIGS. 1 and 2.

The wireless communication device 402 and the wireless communication device 404 may communicate via a link 406-*a* and a link 406-*b*. The link 406-*a* may be an example of an uplink and the link 406-*b* may be an example of a downlink. In some implementations, the wireless communication device 404 may transmit a first frame 408 (such as a probe request frame) to the wireless communication device 402 via the link 406-*a*, the first frame including a multi-link element including or otherwise conveying a request for profile information associated with a plurality of AP MLDs. For instance, in examples in which the wireless communication device 402 is an AP 304, or an AP 302 affiliated with an AP 304, the wireless communication device 404 may transmit the first frame to the wireless communication device 402 to request profile information associated with multiple other APs 304 within the AP (MLD) group 306. For example, the wireless communication device 404 (a non-AP MLD) may be interested in collecting information about multiple APs when the wireless communication device 404 is about to perform roaming as, given a location and movement of the wireless communication device 404, the wireless communication device 404 may not be aware of which candidate AP may be best suited to serve the wireless communication device 404 (such as which candidate AP may provide a sufficiently reliable connection or a relevant service, among other aspects that the wireless communication device 404 may consider when roaming).

To solicit the profile information associated with multiple AP MLDs via the first frame 408, the wireless communication device 404 may support one or more of various signaling mechanisms. In some implementations, the wireless communication device 404 may include, in the first frame 408, one per-MLD profile subelement per requested AP MLD in a link info field of a multi-link element of the first frame 408. Additionally, or alternatively, the wireless communication device 404 may provide a list of AP MLD IDs in a common info field of a multi-link element (such as a probe request multi-link element) of the first frame 408. Additionally, or alternatively, the wireless communication device 404 may provide a list of AP MLD IDs in a link info field of a multi-link element (such as a probe request multi-link element) of the first frame 408. Additionally, or alternatively, the wireless communication device 404 may include a separate multi-link element (such as a separate probe request multi-link element) in the first frame 408 for each requested AP MLD. Additionally, or alternatively, the wireless communication device 404 may transmit a separate frame (such as a separate probe request frame) for each requested AP MLD (in such implementations, the wireless communication device 404 may transmit multiple versions of the first frame 408, one for each requested AP MLD).

In accordance with transmitting the first frame 408 requesting the profile information associated with the multiple AP MLDs, the wireless communication device 402 may transmit a second frame 410 (such as a probe response frame) to the wireless communication device 404 including at least a portion of the requested profile information (if not all of the requested profile information). In other words, when the wireless communication device 404 (a non-AP MLD) requests information of multiple AP MLDs affiliated with the AP (MLD) group 306, the wireless communication device 402 (as or via an affiliated AP 302) may provide information of the requested AP MLDs. The wireless communication device 402 may provide the requested information, or at least a portion thereof, in accordance with one or more of various signaling mechanisms.

In some implementations, the wireless communication device 402 may provide at least a portion of the requested profile information via a multi-link element of the second frame 410 configured (such as formatted or generated) to carry profile information associated with multiple AP MLDs. For example, the wireless communication device 402 may provide information of each AP MLD affiliated with the AP (MLD) group 306 in a respective per-MLD profile subelement (such as in a link info field of the multi-link element). In such implementations, an AP MLD ID in an MLD control field may identify the AP MLD. Depending on the requested information, the wireless communication device 402 may include one or both of MLD-level common information (such as EML or MLD capabilities or an AP MLD MAC address) in an MLD info field and partial or complete profile information of the affiliated APs (such as affiliated APs 302) in an MLD profile field via one or more per-STA (or per-link) profile subelements.

Additionally, or alternatively, the wireless communication device 402 may include one multi-link element (such as one basic multi-link element) in the second frame 410 for each requested AP MLD. In such implementations, a common info field of the multi-link element may carry the AP MLD ID that identifies the MLD whose information is carried in the multi-link element. In addition to the requested AP MLD(s), one multi-link element (such as one basic multi-link element) may be included that describes (such as includes the information associated with) the MLD with which the reporting AP is affiliated (such as the wireless communication device 402).

Additionally, or alternatively, the wireless communication device 402 may include, in the second frame 410, a first multi-link element (such as one basic multi-link element) to carry information of the MLD with which the reporting AP is affiliated (such as the wireless communication device 402) and a second multi-link element configured (such as for-matted or generated) to carry profile information associated with multiple AP MLDs. In such implementations, the first multi-link element carrying the information of the MLD with which the reporting AP is affiliated may include an AP MLD ID set to zero and the second multi-link element may carry the information of the multiple AP MLDs for which information was requested by the wireless communication device 404. For example, the second multi-link element may include a per-MLD profile subelement for each requested AP MLD in a link info field of the second multi-link element. In some examples, the link info field of the second multi-link element may include one or more per-STA (or per-link) profile subelements to provide information associated with the affiliated APs of each requested AP MLD. In some other examples, each per-MLD profile subelement may include one or more per-STA (or per-link) profile subelements to provide information associated with the affiliated APs of that requested AP MLD.

In some implementations, the information associated with the requested AP MLDs affiliated with the AP (MLD) group 306 to be reported by the wireless communication device 402 may not fit within the second frame 410 (such as within a single frame). For example, some non-AP STAs (such as the wireless communication device 404) may have a limi-tation or restriction in terms of a maximum or upper limit PPDU size that the client can receive (and decode or parse). Additionally, or alternatively, a non-AP STA (such as the wireless communication device 404) may have other restrictions and may indicate such restrictions via the first frame 408. For example, a subfield in a common info field of a multi-link element of the first frame 408 may specify a size limit associated with the second frame 410. Alternatively, when a probe request is used outside of the context of discovery, a non-AP STA (such as the wireless communication device 404) may include an indication of the limit of a size associated with the second frame 410 in one or more (re) association request frames that the non-AP STA sends to an AP MLD (such as a device, MLD, functionality, or logical address associated with the AP (MLD) group 306). The limitation on the size associated with the second frame 410 may be a maximum management MAC protocol data unit (MMPDU) size, a maximum PSDU size, or a maximum PPDU duration.

In such implementations in which the wireless communication device 404 is constrained by a size associated with the second frame 410, the wireless communication device 402 (via or as a reporting AP) may split the information associated with the requested AP MLDs across multiple response frames (such as multiple versions of the second frame 410). In some examples, the wireless communication device 402 may provide (such as include) an indication in the second frame 410 that more frames are remaining (such as forthcoming, such as to be transmitted by the wireless communication device 402 in the future). In such examples, the wireless communication device 404 may continue monitoring for additional frames from the wireless communication device 402 until all information associated with the requested AP MLDs is received. For example, a first frame may include profile information associated with a first subset of the requested AP MLDs, a second frame may include profile information associated with a second subset of the requested AP MLDs, and so on until profile information associated with all requested AP MLDs is provided to the wireless communication device 404. The information of a single requested MLD may also be split across different frames (such as via fragmentation). For example, a first frame may include a first portion of profile information associated with an AP MLD and a second frame may include a second (such as remaining) portion of the profile information associated with the AP MLD. In some implementations, the wireless communication device 402 may include a flag (such as an indication or an indicator) in a final frame providing information associated with the requested AP MLDs to indicate that all information associated with the requested AP MLDs has been sent (and that no additional information is forthcoming).

Alternatively, the wireless communication device 402 may provide (such as include) an indication in the second frame 410 for the wireless communication device 404 to request the remaining information. In such examples, the wireless communication device 404, in accordance with (such as based on) receiving such an indication that additional information associated with the requested AP MLDs is available on request, may selectively transmit another request to the wireless communication device 402 for the remaining information in accordance with whether the remaining information is still desired by the wireless communication device 404. For example, if a first portion of the information provided by the second frame 410 is sufficient for the wireless communication device 404 to select another AP for seamless roaming, the wireless communication device 404 may refrain from requesting the remaining information. Alternatively, if the first portion of the information provided by the second frame 410 is insufficient for the wireless communication device 404 to select another AP for seamless roaming, the wireless communication device 404 may transmit another frame to request the remaining information.

Alternatively, the wireless communication device 402 may provide information for only a subset of requested AP MLDs and may additionally indicate that these are the only AP MLDs that the wireless communication device 404 is expected to consider for roaming. The wireless communication device 402 may provide such an indication in one or more of various specific scenarios, such as when the wireless communication device 402 is aware of an optimal subset of AP MLDs that are suitable for the wireless communication device 404's roaming decisions. The wireless communication device 402 may provide information for such a subset of requested AP MLDs upon (such as based on or in accordance with) an indication for such a filtered response in the first frame 408 sent by the wireless communication device 404. In other words, the wireless communication device 404 may indicate, via the first frame 408, that the wireless communication device 402 may (such as is allowed or expected to) provide information for a subset of the requested AP MLDs if the wireless communication device 402 is confident (such as at or above a confidence threshold) that the subset is likely inclusive of the AP MLD that the wireless communication device 404 will ultimately select for association in accordance with roaming.

The wireless communication device 402 and the wireless communication device 404 may use one or more of various formats associated with a multi-link element to solicit or provide, or both, information associated with multiple AP MLDs. Additional details related to such various formats are illustrated by and described with reference to FIGS. 5-7. Further, although the various multi-link element formats are illustrated and described separately, the various multi-link element formats of FIGS. 5-7 may be combined in whole or in part. For example, aspects of a first multi-link element format may be combinable, or replaceable, with aspects of a second multi-link element format, such that any permutation of fields or subfields of the various multi-link element formats may be within the scope of the present disclosure. Further, "fields" and "subfields" may sometimes be used to differentiate between levels of a hierarchical structure associated with elements (including multi-link elements), but may generally be used interchangeably herein.

Figure 5:
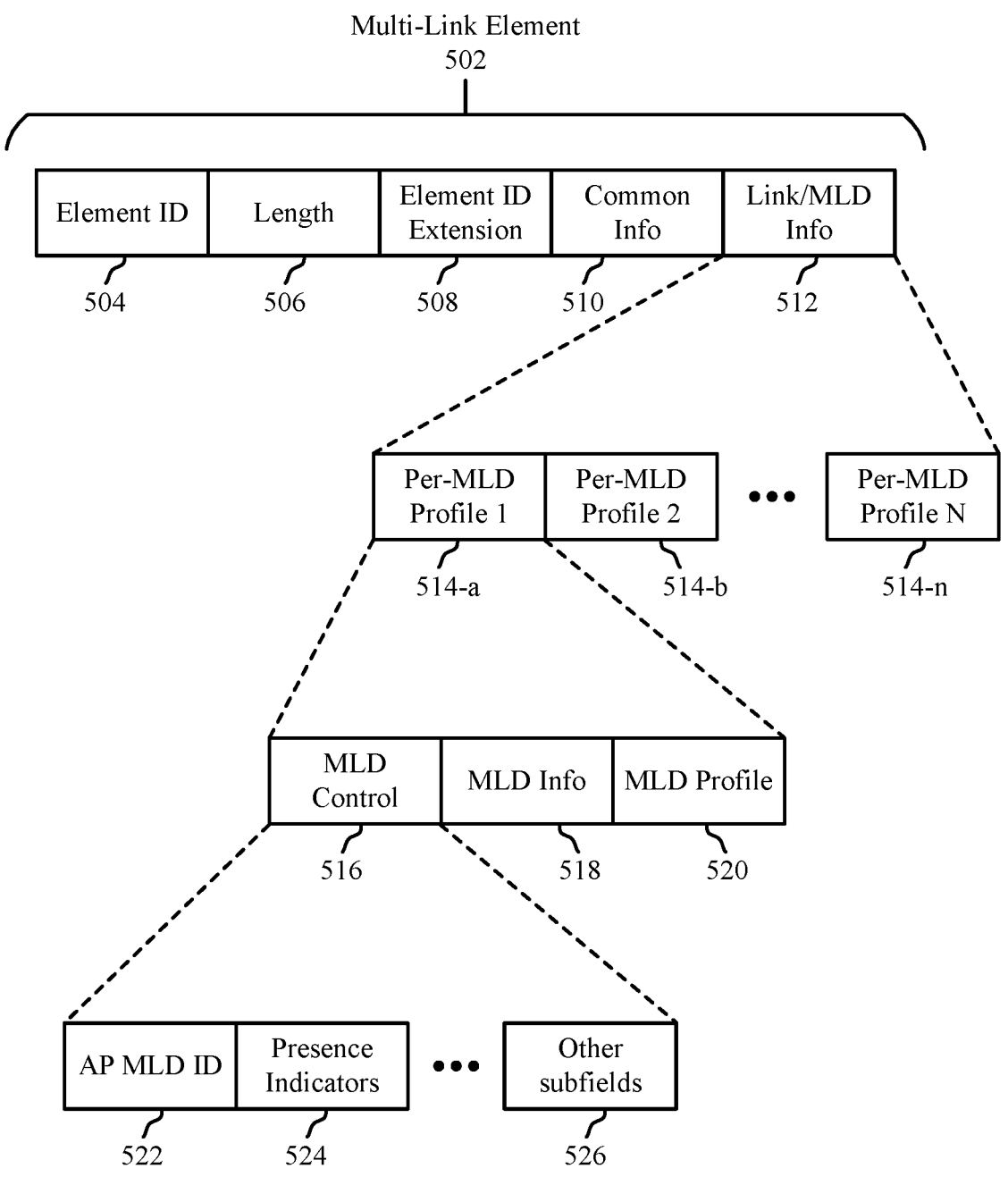
FIGS. 5-7 show example multi-link element formats that support multi-link probing enhancements for more seamless roaming.

FIG. 5 shows an example multi-link element format 500 that supports multi-link probing enhancements for more seamless roaming. The multi-link element format 500 may implement or be implemented to realize one or more aspects of the wireless communication network 100, the wireless communication network 200, the hierarchical relationship 300, or the signaling diagram 400. For example, the multi-link element format 500 may be implemented by a wireless communication device, such as the wireless communication device 402 or the wireless communication device 404, to request or provide, or both, profile information associated with multiple AP MLDs. In other words, the wireless communication device 404 may include a multi-link element 502 associated with the multi-link element format 500 in a first frame 408 that the wireless communication device 404 transmits to request profile information associated with multiple AP MLDs. Additionally, or alternatively, the wireless communication device 402 may include the multi-link element 502 associated with the multi-link element format 500 in a second frame 410 that the wireless communication device 402 transmits to provide profile information associated with multiple AP MLDs.

The multi-link element 502 may include a number of fields including, but not limited to, one or more of an element ID field 504, a length field 506, an element ID extension field 508, a common info field 510, and a link/ MLD info field 512. In some implementations, the link/ MLD info field 512 may include multiple per-MLD profile subelements 514, which may generally refer to any one or more of a first per-MLD profile subelement 514-*a*, a second per-MLD profile subelement 514-*b*, and an N*th* per-MLD profile subelement 514-*n*. A quantity of the multiple per-MLD profile subelements 514 may be equal to two, three, four, five, six, or any other number, and may generally be equal to a quantity of AP MLDs for which profile information is requested or provided.

Each per-MLD profile subelement 514, such as the per-MLD profile subelement 514-*a*, may include at least an MLD control subfield 516, an MLD info subfield 518, and an MLD profile subfield 520. In some aspects, the MLD control subfield 516 and the MLD info subfield 518 may take a role associated with a multi-link control and common info fields of the basic multi-link element. For example, the MLD control subfield 516 may include an AP MLD ID subfield 522 that identifies the MLD (from, for example, an AP (MLD) group 306) whose information is carried in the per-MLD profile subelement 514-*a*. Additionally, in some examples, the MLD control subfield 516 may include a presence indicators subfield 524 to indicate a presence of one or more fields inside the MLD info subfield 518 and one or more other subfields 526, potentially among other subfields. The MLD info subfield 518 may carry information such as an MLD MAC address, EML capabilities, MLD capabilities, or extended MLD capabilities, among other MLD-level information associated with the MLD whose information is carried in the per-MLD profile subelement 514-*a*.

Additionally, or alternatively, the MLD profile subfield 520 may carry elements that are applicable at the MLD level, such as a traffic identifier (TID) to link mapping (T2LM) element. In some aspects, the MLD profile subfield 520 may carry one or more per-STA (such as per-link) profile subelements to carry information specific to STAs (such as APs) affiliated with that MLD. For example, if the MLD whose information is provided via the per-MLD profile subelement 514-*a* has two affiliated APs, the MLD profile subfield 520 may include two per-STA profile subelements, each of the two per-STA profile subelements carrying respective information associated with a respective affiliated AP of the two affiliated APs.

Further, for the purposes of soliciting information about multiple AP MLDs, the multi-link element 502 may carrying one per-MLD profile subelement 514 per requested AP MLD in the link/MLD info field 512. In some implementations, a bit in the common info field 510 or in a multi-link control field (which may be present between the element ID extension field 508 and the common info field 510) may indicate whether solicited information is link level or MLD level. In other words, a bit in the common info field 510 or the multi-link control field may differentiate whether solicited information is link level or MLD level.

Additionally, for soliciting information about multiple AP MLDs, the AP MLD ID subfield 522 may identify the requested AP MLD ID. If, within a per-MLD profile subelement 514, no per-STA profile subelements are included in a MLD profile subfield 520, such an absence of per-STA profile subelements may indicate that all APs affiliated with the identified AP MLD are requested. Alternatively, if specific APs affiliated with the identified AP MLD are requested, corresponding per-STA profile subelements may be included in the MLD profile subfield 520. In other words, by including a per-STA profile subelement for an affiliated AP in the MLD profile subfield 520 of the per-MLD profile subelement 514-*a*, the wireless communication device 404 may effectively request profile information associated with the affiliated AP. The wireless communication device 404 may include any quantity of per-STA profile subelements within an MLD profile subfield 520 of a per-MLD profile subelement 514 (such as up to a total quantity of APs affiliated with an AP MLD identified by the AP MLD ID subfield 522). In some implementations, if a per-STA profile subelement is included within an MLD profile subfield 520, a subfield in a STA control field (of that per-STA profile subelement) may indicate whether partial or complete information is requested for the AP identified by the per-STA profile subelement.

In some implementations, the wireless communication device 404 may refrain from including any per-MLD profile subelements 514 in the multi-link element 502 to request information associated with all APs (including all AP MLDs) in a candidate AP set. In other words, if no per-MLD profile subelements 514 are included in the multi-link element 502, all APs in a candidate AP set may be the requested APs. Alternatively, the wireless communication device 404 may refrain from including any per-MLD profile subelements 514 in the multi-link element 502 to indicate that the wireless communication device 402 may select which AP MLDs' information is included in the response frame. Accordingly, the wireless communication device 402 may include information of an optimized set of AP MLDs in the response frame. Such an optimized set of AP MLDs may include one or more AP MLDs that the wireless communication device 402 determines are relatively more likely to be of interest to the wireless communication device 404 when roaming as compared to a remainder of AP MLDs excluded from the response frame. Additionally, or alternatively, the wireless communication device 404 may use an indicator in a per-MLD profile subelement 514 (such as in an MLD control subfield 516) to indicate whether only (such as exclusively) MLD-level common information is requested. Accordingly, if the indicator is set to indicate that only MLD-level common information is requested, a response frame (such as the second frame 410) may not include any STA-specific (such as link- or affiliated AP-specific) information.

Figure 6:
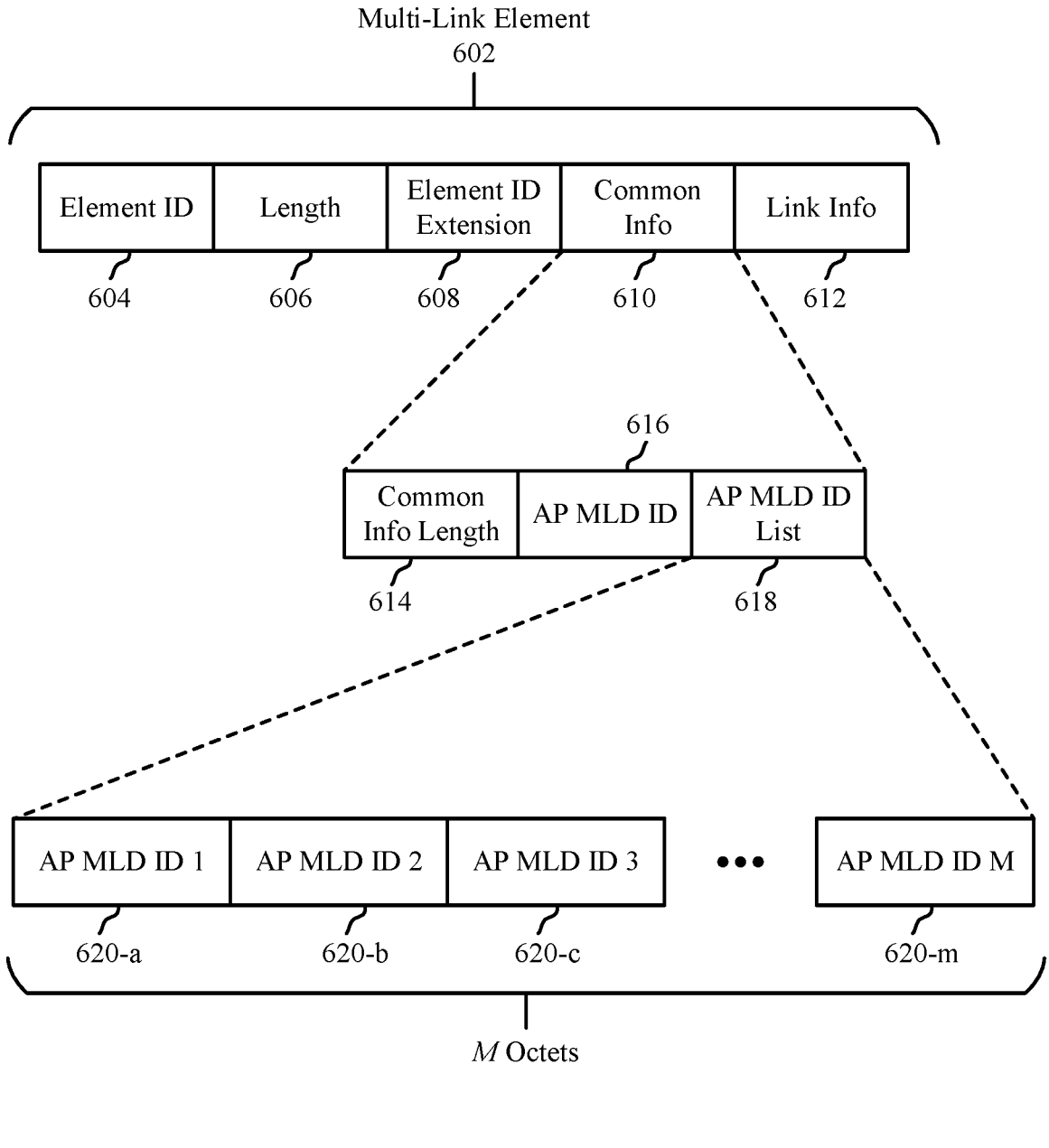

FIG. 6 shows an example multi-link element format 600 that supports multi-link probing enhancements for more seamless roaming. The multi-link element format 600 may implement or be implemented to realize one or more aspects of the wireless communication network 100, the wireless communication network 200, the hierarchical relationship 300, or the signaling diagram 400. For example, the multi-link element format 600 may be implemented by a wireless communication device, such as the wireless communication device 402 or the wireless communication device 404, to request or provide, or both, profile information associated with multiple AP MLDs. In other words, the wireless communication device 404 may include a multi-link element 602 associated with the multi-link element format 600 in a first frame 408 that the wireless communication device 404 transmits to request profile information associated with multiple AP MLDs. Additionally, or alternatively, the wireless communication device 402 may include the multi-link element 602 associated with the multi-link element format 600 in a second frame 410 that the wireless communication device 402 transmits to provide profile information associated with multiple AP MLDs.

The multi-link element 602 may include a number of fields including, but not limited to, one or more of an element ID field 604, a length field 606, an element ID extension field 608, a common info field 610, and a link info field 612. In some implementations, the wireless communication device 404 may solicit information about multiple AP MLDs by including a list of the solicited APs via the common info field 610. For example, the wireless commu-
nication device 404 may include, in the common info field
610, a common info length subfield 614, an AP MLD ID
subfield 616, and an AP MLD ID list subfield 618, the AP
MLD ID list subfield 618 providing or including a list of AP
MLDs whose information is requested by the wireless
communication device 404. In some implementations, a
presence of the AP MLD ID list subfield 618 may be
indicated by a corresponding bit (such as an AP MLD ID list
subfield present bit) in a multi-link control field of the
multi-link element 602 (which may be included immediately
prior to the common info field 610).

The AP MLD ID list subfield 618 may include any
quantity of AP MLD IDs, including a first AP MLD ID
620-*a*, a second AP MLD ID 620-*b*, a third AP MLD ID
620-*c*, and an M$^{th}$ AP MLD ID 620-*m*. In some aspects, an
AP MLD ID may be conveyed by 1 byte of information,
such that, if M AP MLD IDs are included in the AP MLD ID
list subfield 618, a length of the list of AP MLD IDs may be
M octets long. The wireless communication device 404 and
the wireless communication device 402 may support one or
more signaling mechanisms according to which the wireless
communication device 404 or the wireless communication
device 402 may convey the value of M (which the wireless
communication device 404 may use to construct the AP
MLD ID list subfield 618 or which the wireless communi-
cation device 402 may use to accurately parse or decode the
AP MLD ID list subfield 618, or both).

In some implementations, the wireless communication
device 404 may use a first (such as initial) entry of the AP
MLD ID list subfield 618 to indicate the value of M. In other
words, instead of indicating an AP MLD ID, an initial entry
of the AP MLD ID list subfield 618 may indicate the value
of M. In some other implementations, a subfield in the
common info field 610 may indicate the value of M. Such a
subfield may be a subfield dedicated (such as by name or
function) to conveying the value of M or may be the AP
MLD ID subfield 616, which may be repurposed to provide
the value of M (because, if the AP MLD ID list subfield 618
is present, the AP MLD ID subfield 616 is unused). In some
other implementations, one or both of the wireless commu-
nication device 402 or the wireless communication device
404 may be expected to infer a length of the AP MLD ID list
subfield 618 based on a length of the common info field 610
(and based on known lengths of other subfields in the
common info field 610).

Figure 7:
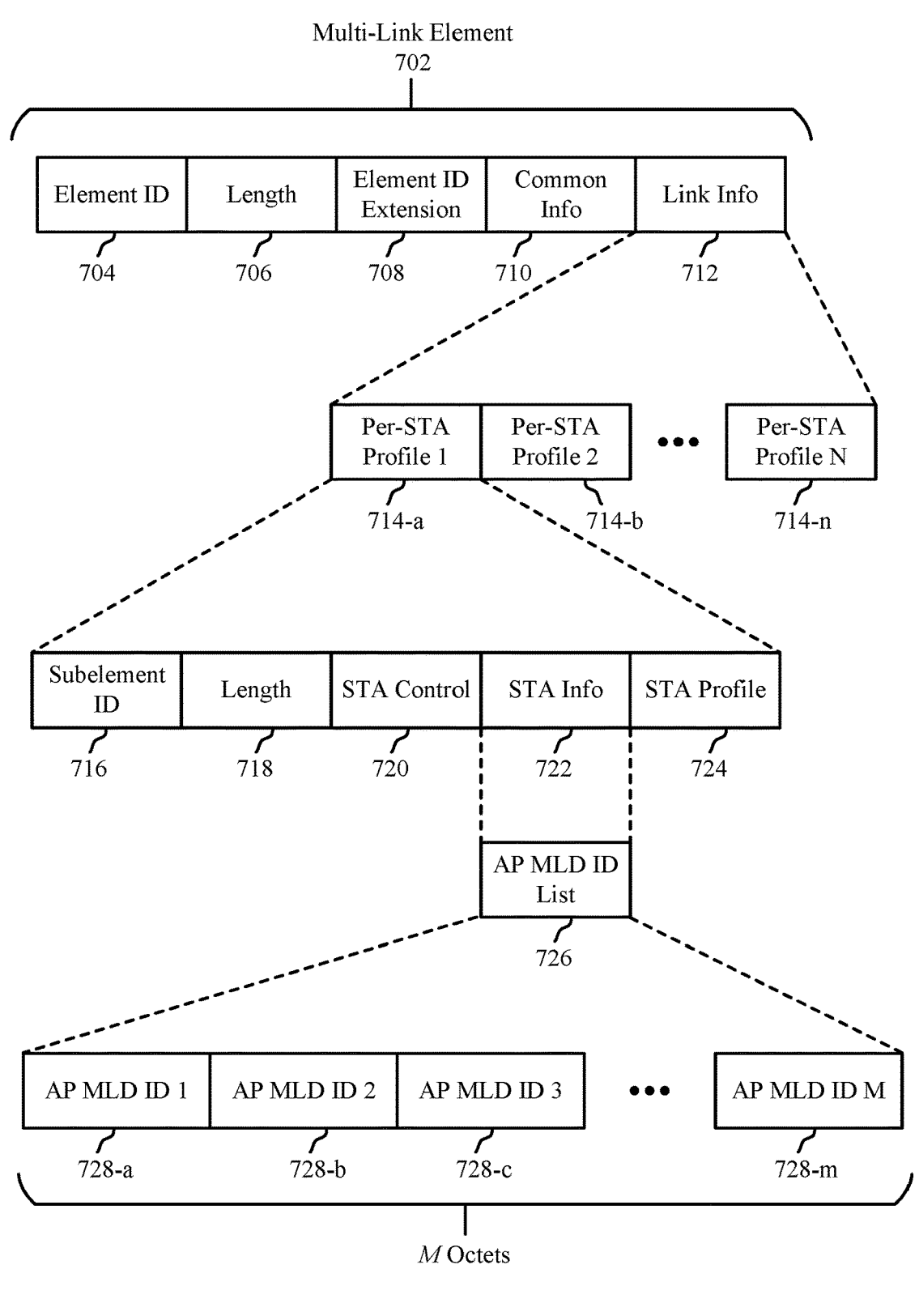

FIG. 7 shows an example multi-link element format 700
that supports multi-link probing enhancements for more
seamless roaming. The multi-link element format 700 may
implement or be implemented to realize one or more aspects
of the wireless communication network 100, the wireless
communication network 200, the hierarchical relationship
300, or the signaling diagram 400. For example, the multi-
link element format 700 may be implemented by a wireless
communication device, such as the wireless communication
device 402 or the wireless communication device 404, to
request or provide, or both, profile information associated
with multiple AP MLDs. In other words, the wireless
communication device 404 may include a multi-link element
702 associated with the multi-link element format 700 in a
first frame 408 that the wireless communication device 404
transmits to request profile information associated with
multiple AP MLDs. Additionally, or alternatively, the wire-
less communication device 402 may include the multi-link
element 702 associated with the multi-link element format
700 in a second frame 410 that the wireless communication device 402 transmits to provide profile information associ-
ated with multiple AP MLDs.

The multi-link element 702 may include a number of
fields including, but not limited to, one or more of an
element ID field 704, a length field 706, an element ID
extension field 708, a common info field 710, and a link info
field 712. In some implementations, the wireless communi-
cation device 404 may solicit information about multiple AP
MLDs by including a list of the solicited APs via the link
info field 712. For example, the wireless communication
device 404 may include, in the link info field 712, one or
more per-STA profile subelements 714, which may generally
refer to any one or more of a first per-STA profile subelement
714-*a*, a second per-STA profile subelement 714-*b*, and an
N$^{th}$ per-STA profile subelement 714-*n*. Each per-STA profile
subelement 714 may include a subelement ID field 716, a
length field 718, a STA control field 720, a STA info field
722, and a STA profile 724 and, in some implementations,
the STA info field 722 may include an AP MLD ID list
subfield 726.

In such implementations in which the STA info field 722
includes an AP MLD ID list subfield 726, a link ID subfield
may be set to a special value (such as a value of 15) to
indicate that the purpose, role, or function of the first
per-STA profile subelement 714-*a* is to convey a request for
information associated with the listed AP MLD IDs. In some
implementations, a presence of the AP MLD ID list subfield
726 may be indicated by a corresponding bit (such as an AP
MLD ID list subfield present bit) in the STA control field
720. In some implementations, a complete profile requested
subfield in the per-STA profile subelement may be repur-
posed to either request complete profile information of all
the listed AP MLDs or request partial profile information of
all the listed AP MLDs.

The AP MLD ID list subfield 726 may include any
quantity of AP MLD IDs, including a first AP MLD ID
728-*a*, a second AP MLD ID 728-*b*, a third AP MLD ID
728-*c*, and an M$^{th}$ AP MLD ID 728-*m*. In some aspects, an
AP MLD ID may be conveyed by 1 byte of information,
such that, if M AP MLD IDs are included in the AP MLD ID
list subfield 726, a length of the list of AP MLD IDs may be
M octets long. The wireless communication device 404 and
the wireless communication device 402 may support one or
more signaling mechanisms according to which the wireless
communication device 404 or the wireless communication
device 402 may convey the value of M (which the wireless
communication device 404 may use to construct the AP
MLD ID list subfield 726 or which the wireless communi-
cation device 402 may use to accurately parse or decode the
AP MLD ID list subfield 618, or both).

In some implementations, the wireless communication
device 404 may use a first (such as initial) entry of the AP
MLD ID list subfield 726 to indicate the value of M. In other
words, instead of indicating an AP MLD ID, an initial entry
of the AP MLD ID list subfield 726 may indicate the value
of M. In some other implementations, a field in the STA info
field 722 may provide (such as include or indicate) the value
of M. In some other implementations, a field in the STA
control field 720 may provide (such as include or indicate)
the value of M.

Figure 8:
FIG. 8 shows an example deployment associated with a multiple basic service set (BSS) (MBSS) identifier (ID) (MBSSID) set that supports multi-link probing enhancements for more seamless roaming.

FIG. 8 shows an example deployment 800 associated with
a MBSSID set that supports multi-link probing enhance-
ments for more seamless roaming. The deployment 800 may
implement or be implemented to realize one or more aspects
of the wireless communication network 100, the wireless
communication network 200, the hierarchical relationship
300, the signaling diagram 400, the multi-link element format 500, the multi-link element format 600, or the multi-link element format 700. For example, the deployment 800 may include or otherwise be associated with an MLD 802-*a*, an MLD 802-*b*, an MLD 802-*c*, and an MLD 802-*d*, which may be examples of corresponding devices as described herein. For example, the MLDs 802, which may generally refer to any one or more of the MLD 802-*a*, the MLD 802-*b*, the MLD 802-*c*, and the MLD 802-*d*, may be examples of AP MLDs, such as AP MLDs associated with a same AP (MLD) group 306. In some aspects, the deployment 800 may be associated with considerations for MBSSID scenario, and supporting MLO and MBSSID configurations. In some implementations, the deployment 800 shows how MBSSIDs would appear on one of the APs and their relationship with other APs.

In accordance with an MBSSID scenario, one BSSID (such as one AP) within the MBSSID set transmits beacon and probe response frames, with such a BSSID being understood as a transmitted BSSID (TxBSSID and other BSSIDs being understood as nonTxBSSIDs. Each BSSID in an MBSSID set may be referred to as a virtual AP (VAP). When an AP of an AP MLD is in an MBSSID set and is the transmitted BSSID, the AP includes an MBSSID element (including information associated with other APs, such as nonTxBSSIDs, associated with a same link), a multi-link element (including information associated with other APs affiliated with the same AP MLD as the reporting AP), and a multi-link (sub) element within the MBSSID element (including information associated with other APs, such as nonTxBSSIDs, associated with different links than the link on which the reporting AP operates). Each AP MLD may have a different AP MLD ID. In beacon and probe response frames, the multi-link element carried by the TxBSSID may, in some systems, be expected to be included in the common info field.

The deployment 800 illustrates two extended service sets (ESSs), ESS 1 and ESS 2, each of which may be understood as a respective network. For example, APs of a same ESS may be connected (physically or virtually) with each other. In some aspects, APs of a same ESS may be part of a same distribution service (DS), such as part of a same LAN network on a backhaul. For example, the ESS 1 is associated with a DS 1 and the ESS 2 is associated with a DS 2. Access to a same DS may be understood as being associated with access to a same set of services (such as access to a same set of networks). Further, all APs of a same ESS may advertise a same SSID. In some aspects, different APs in an MBSSID set may belong to different ESSs and therefore may be connected to different DSs.

As illustrated in the example of the deployment 800, the MLD 802-*a* and the MLD 802-*b* may be associated with a multi-link AP box 804-*a* (such as a single physical device) hosting multiple VAPs on a channel, the MLD 802-*c* may be associated with a single link AP box 804-*b* (such as a single physical device), and the MLD 802-*d* may be associated with a multi-link AP box 804-*c* (such as a single physical device). Further, the MLD 802-*a* and the MLD 802-*b* may support a co-hosted BSSID set 806 on channel 1 and may support an MBSSID set 808 on channel 2. The co-hosted BSSID set 806 may be associated with (such as include) a BSSID-x (associated with a link ID=0 and an SSID 1) and a BSSID-y (associated with a link ID=0 and an SSID 2). The MBSSID set 808 may be associated with (such as include) a BSSID-p (associated with a link ID=1 and an SSID 1) and a BSSID-r (associated with a link ID=1 and an SSID 2). The MLD 802-*a* may further be associated with a BSSID-a (associated with a link ID=2 and an SSID 1). The MLD

802-*c* may be associated with a BSSID-c (associated with a link ID=1 and an SSID 2). The MLD 802-*d* may be associated with a BSSID-q (associated with a link ID=0) and an SSID 1) and a BSSID-b (associated with a link ID=1 and an SSID 1).

In accordance with the BSSID-x and the BSSID-y belonging to a same co-hosted BSSID set, each of the BSSID-x and the BSSID-y may transmit beacon or probe response frames. In accordance with the BSSID-p and the BSSID-r belonging to a same MBSSID set, only one of the BSSID-p or the BSSID-r may transmit beacon or probe response frames (depending on which of the BSSID-r or the BSSID-p is a TxBSSID). If BSSID-p is the TxBSSID, the BSSID-p may have an MBSSID element that provides information on BSSID-r. Any probe request frames directed toward BSSID-r may be responded to by BSSID-p carrying the MBSSID element providing the information on BSSID-r.

In the context of seamless roaming, the BSSID-p may advertise a reduced neighbor report (RNR) to provide information of BSSID-x, BSSID-y, and BSSID-r as well as information of MLD 802-*c* and MLD 802-*d* (because the MLD 802-*c* and the MLD 802-*d* may be candidate APs for roaming). As such, the RNR may be a union of candidate APs affiliated with a same AP MLD as the reporting AP and candidate APs belonging to (such as associated with) the nonTxBSSIDs (such as the network of nonTxBSSIDs). If a non-AP STA transmits a probe request to gather information associated with candidate APs for roaming, the BSSID-p may be the AP to respond and provide that information on behalf of BSSID-r (even if the probe sent by the non-AP STA was addressed to the BSSID-R). Similarly, a non-AP STA may query the MLD 802-*d* for information associated with the BSSID-q and the BSSID-b or may query the MLD 802-*c* for information associated with the BSSID-c, or both, and such queries and (corresponding responses) may be funneled or directed through the BSSID-p (in examples in which the BSSID-p is the TxBSSID), even when the AP MLDs for which information is requested are associated with separate physical devices (such as when the requested AP MLDs are friendly devices). As such, a roaming non-AP STA may gather information associated with many other APs affiliated with a same AP MLD or different AP MLDs, which may be associated with different physical devices and which may support communication via different links (such as different links as compared to the links supported by the AP MLD with which the non-AP STA is currently associated).

Figure 9:
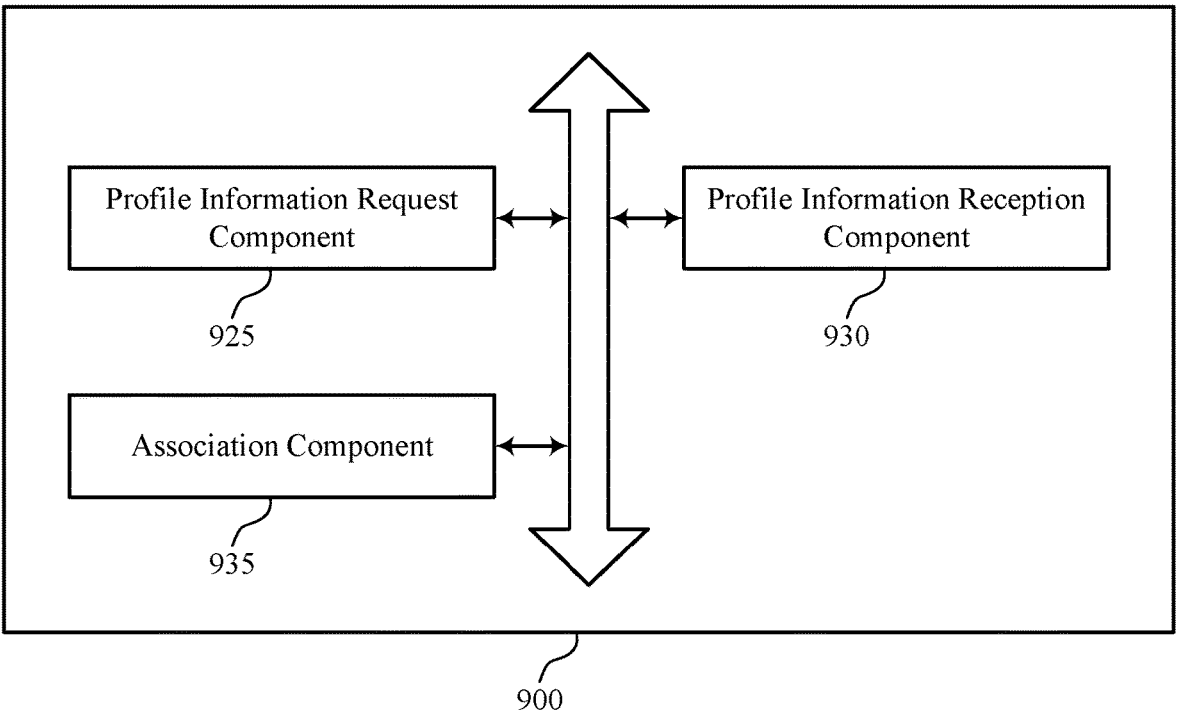
FIGS. 9 and 10 show block diagrams of example wireless communication devices that support multi-link probing enhancements for more seamless roaming.

FIG. 9 shows a block diagram of an example wireless communication device 900 that supports multi-link probing enhancements for more seamless roaming. In some examples, the wireless communication device 900 is configured to perform the process 1100 described with reference to FIG. 11. The wireless communication device 900 may include one or more chips, SoCs, chipsets, packages, components or devices that individually or collectively constitute or include a processing system. The processing system may interface with other components of the wireless communication device 900, and may generally process information (such as inputs or signals) received from such other components and output information (such as outputs or signals) to such other components. In some aspects, an example chip may include a processing system, a first interface to output or transmit information and a second interface to receive or obtain information. For example, the first interface may refer to an interface between the processing system of the chip and a transmission component, such that the wireless communication device 900 may transmit the information output from the chip. In such an example, the second interface may refer to an interface between the processing system of the chip and a reception component, such that the wireless communication device 900 may receive information that is then passed to the processing system. In some such examples, the first interface also may obtain information, such as from the transmission component, and the second interface also may output information, such as to the reception component.

The processing system of the wireless communication device 900 includes processor (or "processing") circuitry in the form of one or multiple processors, microprocessors, processing units (such as central processing units (CPUs), graphics processing units (GPUs) or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. The processing system may further include memory circuitry in the form of one or more memory devices, memory blocks, memory elements or other discrete gate or transistor logic or circuitry, each of which may include tangible storage media such as random-access memory (RAM) or ROM, or combinations thereof (all of which may be generally referred to herein individually as "memories" or collectively as "the memory" or "the memory circuitry"). One or more of the memories may be coupled with one or more of the processors and may individually or collectively store processor-executable code that, when executed by one or more of the processors, may configure one or more of the processors to perform various functions or operations described herein. Additionally, or alternatively, in some examples, one or more of the processors may be preconfigured to perform various functions or operations described herein without requiring configuration by software. The processing system may further include or be coupled with one or more modems (such as a Wi-Fi (such as IEEE compliant) modem or a cellular (such as 3GPP 4G LTE, 5G or 6G compliant) modem). In some implementations, one or more processors of the processing system include or implement one or more of the modems. The processing system may further include or be coupled with multiple radios (collectively "the radio"), multiple RF chains or multiple transceivers, each of which may in turn be coupled with one or more of multiple antennas. In some implementations, one or more processors of the processing system include or implement one or more of the radios, RF chains or transceivers.

In some examples, the wireless communication device 900 can configurable or configured for use in a STA, such as the STA 104 described with reference to FIG. 1. In some other examples, the wireless communication device 900 can be a STA that includes such a processing system and other components including multiple antennas. The wireless communication device 900 is capable of transmitting and receiving wireless communications in the form of, for example, wireless packets. For example, the wireless communication device 900 can be configurable or configured to transmit and receive packets in the form of physical layer PPDUs and MPDUs conforming to one or more of the IEEE 802.11 family of wireless communication protocol standards. In some other examples, the wireless communication device 900 can be configurable or configured to transmit and receive signals and communications conforming to one or more 3GPP specifications including those for 5G NR or 6G. In some examples, the wireless communication device 900 also includes or can be coupled with one or more application processors which may be further coupled with one or more other memories. In some examples, the wireless communication device 900 further includes a user interface (UI) (such as a touchscreen or keypad) and a display, which may be integrated with the UI to form a touchscreen display that is coupled with the processing system. In some examples, the wireless communication device 900 may further include one or more sensors such as, for example, one or more inertial sensors, accelerometers, temperature sensors, pressure sensors, or altitude sensors, that are coupled with the processing system.

The wireless communication device 900 includes a profile information request component 925, a profile information reception component 930, and an association component 935. Portions of one or more of the profile information request component 925, the profile information reception component 930, and the association component 935 may be implemented at least in part in hardware or firmware. For example, one or more of the profile information request component 925, the profile information reception component 930, and the association component 935 may be implemented at least in part by at least a processor or a modem. In some examples, portions of one or more of the profile information request component 925, the profile information reception component 930, and the association component 935 may be implemented at least in part by a processor and software in the form of processor-executable code stored in memory.

The wireless communication device 900 may support wireless communication in accordance with examples as disclosed herein. The profile information request component 925 is configurable or configured to transmit a first frame indicating, via a multi-link element of the first frame, a request for profile information associated with a set of multiple AP multi-link devices (MLDs). The profile information reception component 930 is configurable or configured to receive, in association with transmitting the first frame, a second frame indicating, via one or more multi-link elements of the second frame, at least a portion of the profile information associated with the set of multiple AP MLDs.

In some examples, the profile information request component 925 is configurable or configured to include, in a link info field of the multi-link element of the first frame, a set of multiple per-MLD profile subelements associated with the set of multiple AP MLDs, where a presence of each respective per-MLD profile subelement of the set of multiple per-MLD profile subelements indicates a request for respective profile information associated with a respective AP MLD of the set of multiple AP MLDs.

In some examples, to support including the set of multiple per-MLD profile subelements in the link info field, the profile information request component 925 is configurable or configured to include a first per-MLD profile subelement associated with a first AP MLD in the link info field to indicate a request for first profile information associated with the first AP MLD, the first per-MLD profile subelement including at least a first MLD control field and a first MLD info field.

In some examples, the first MLD control field include a first AP MLD identifier subfield identifying the first AP MLD.

In some examples, a first MLD profile field of the first per-MLD profile subelement include one or more first per-station (STA) profile subelements or is absent of first per-STA profile subelements. In some examples, inclusion of the one or more first per-STA profile subelements in the first MLD profile field indicate a request for STA-specific profile information associated with each of one or more first APs affiliated with the first AP MLD that are identified by the one or more first per-STA profile subelements. In some examples, absence of the first per-STA profile subelements from the first MLD profile field indicate a request for STA-specific profile information associated with all APs affiliated with the first AP MLD.

In some examples, a first indication in the first MLD control field indicate whether first MLD-level common information is exclusively requested for the first AP MLD.

In some examples, the profile information request component 925 is configurable or configured to include, in a multi-link control field or a common info field of the multi-link element of the first frame, an indication of whether the profile information requested by the first frame includes MLD-level profile information or link-level profile information.

In some examples, the profile information request component 925 is configurable or configured to exclude per-MLD profile subelements from a link info field of the multi-link element of the first frame, where an absence of the per-MLD profile subelements indicates a request for profile information associated with all AP MLDs in a candidate AP set.

In some examples, the profile information request component 925 is configurable or configured to include, in a common info field of the multi-link element of the first frame, a list of the set of multiple AP MLDs, where a presence of the list of the set of multiple AP MLDs in the common info field indicates the request for the profile information associated with the set of multiple AP MLDs.

In some examples, the profile information request component 925 is configurable or configured to include, in a multi-link control field of the multi-link element of the first frame, an indication of a presence of an AP MLD identifier list subfield including the list of the set of multiple AP MLDs in the common info field.

In some examples, the profile information request component 925 is configurable or configured to include, as an initial entry in an AP MLD identifier list subfield including the list of the set of multiple AP MLDs, an indication of a length of the AP MLD identifier list subfield.

In some examples, the profile information request component 925 is configurable or configured to include, in a field of the common info field, an indication of a length of an AP MLD identifier list subfield including the list of the set of multiple AP MLDs.

In some examples, the field may be a dedicated field associated with indicating the length of the AP MLD identifier list subfield or an AP MLD identifier subfield. In some examples, the AP MLD identifier subfield be used to indicate the length of the AP MLD identifier list subfield in accordance with the AP MLD identifier list subfield being present in the common info field.

In some examples, the profile information request component 925 is configurable or configured to include, in a link info field of the multi-link element of the first frame, a list of the set of multiple AP MLDs, where a presence of the list of the set of multiple AP MLDs in the link info field indicates the request for the profile information associated with the set of multiple AP MLDs.

In some examples, the profile information request component 925 is configurable or configured to set a link identifier subfield of a per-station (STA) profile subelement including the list of the set of multiple AP MLDs to a value to indicate that the per-STA profile subelement includes the list of the set of multiple AP MLDs and indicates the request for the profile information associated with the set of multiple AP MLDs.

In some examples, the profile information request component 925 is configurable or configured to include, in a STA control subfield of the per-STA profile subelement, an indication of a presence of an AP MLD identifier list subfield including the list of the set of multiple AP MLDs in the per-STA profile subelement.

In some examples, a subfield of the per-STA profile subelement indicate whether a complete profile of the set of multiple AP MLDs or a partial profile of the set of multiple AP MLDs is requested.

In some examples, the profile information request component 925 is configurable or configured to include, as an initial entry in an AP MLD identifier list subfield including the list of the set of multiple AP MLDs, an indication of a length of the AP MLD identifier list subfield.

In some examples, the profile information request component 925 is configurable or configured to include, in a subfield of a STA info field of the per-STA profile subelement, an indication of a length of an AP MLD identifier list subfield including the list of the set of multiple AP MLDs.

In some examples, the profile information request component 925 is configurable or configured to include, in a subfield of a STA control field of the per-STA profile subelement, an indication of a length of an AP MLD identifier list subfield including the list of the set of multiple AP MLDs.

In some examples, to support receiving at least the portion of the profile information associated with the set of multiple AP MLDs, the profile information reception component 930 is configurable or configured to receive, via a link info field of a second multi-link element of the second frame, a set of multiple per-MLD profile subelements associated with the set of multiple AP MLDs, where each respective per-MLD profile subelement of the set of multiple per-MLD profile subelements provides respective profile information associated with a respective AP MLD of the set of multiple AP MLDs, and where the one or more multi-link elements of the second frame include the second multi-link element.

In some examples, the link info field of the second multi-link element include a first per-MLD profile subelement providing first profile information associated with a first AP MLD of the set of multiple AP MLDs, the first per-MLD profile subelement including at least a first MLD control field and a first MLD info field.

In some examples, the first MLD control field include a first AP MLD identifier subfield identifying the first AP MLD, and the first MLD info field includes first MLD-level common information associated with the first AP MLD.

In some examples, a first MLD profile field of the first per-MLD profile subelement include one or more first per-station (STA) profile subelements, each first per-STA profile subelement of the one or more first per-STA profile subelements providing respective profile information associated with a respective AP affiliated with the first AP MLD.

In some examples, to support receiving at least the portion of the profile information associated with the set of multiple AP MLDs, the profile information reception component 930 is configurable or configured to receive, via the link info field of the multi-link element of the first frame, a set of multiple per-station (STA) profile subelements associated with the set of multiple AP MLDs, where each respective per-STA profile subelement of the set of multiple per-STA profile subelements provides respective profile information associated with a respective AP affiliated with a respective AP MLD of the set of multiple AP MLDs.

In some examples, to support receiving at least the portion of the profile information associated with the set of multiple AP MLDs, the profile information reception component 930 is configurable or configured to receive a set of multiple multi-link elements via the second frame, where each multi-link element of the set of multiple multi-link elements provides respective profile information associated with a respective AP MLD of the set of multiple AP MLDs, and where the one or more multi-link elements of the second frame include the set of multiple multi-link elements.

In some examples, to support receiving at least the portion of the profile information associated with the set of multiple AP MLDs, the profile information reception component 930 is configurable or configured to receive, via a first multi-link element of the second frame, first profile information associated with a first AP MLD, where a reporting AP that transmits the second frame is affiliated with the first AP MLD. In some examples, to support receiving at least the portion of the profile information associated with the set of multiple AP MLDs, the profile information reception component 930 is configurable or configured to receive, via a link info field of a second multi-link element of the second frame, a set of multiple per-MLD profile subelements providing the profile information associated with the plurality AP MLDs, where each respective per-MLD profile subelement of the set of multiple per-MLD profile subelements provides respective profile information associated with a respective AP MLD of the set of multiple AP MLDs, and where the one or more multi-link elements of the second frame include the second multi-link element.

In some examples, to support receiving at least the portion of the profile information associated with the set of multiple AP MLDs, the profile information reception component 930 is configurable or configured to receive, via a common info field of at least one multi-link element of the one or more multi-link elements, information that is associated with a grouping of the set of multiple AP MLDs.

In some examples, to support receiving at least the portion of the profile information associated with the set of multiple AP MLDs, the profile information reception component 930 is configurable or configured to receive, via the second frame, an indication that additional profile information associated with the set of multiple AP MLDs not included in the second frame is forthcoming via one or more additional frames. In some examples, to support receiving at least the portion of the profile information associated with the set of multiple AP MLDs, the profile information reception component 930 is configurable or configured to receive, via the second frame, an indication that additional profile information associated with the set of multiple AP MLDs not included in the second frame is available upon further request by the wireless communication device.

In some examples, the association component 935 is configurable or configured to associate with a first MLD of the set of multiple MLDs in accordance with the profile information associated with the set of multiple MLDs, where association with the first MLD is in accordance with a roaming procedure at the wireless communication device. In some examples, the association component 935 may simply select the first MLD for communication, as the wireless communication device 900 may avoid an association procedure with the first MLD in accordance with receiving the second frame.

In some examples, the second frame be received from a second MLD, the second MLD being different from the first MLD.

In some examples, the first frame be a probe request frame and the second frame is a probe response frame.

Figure 10:
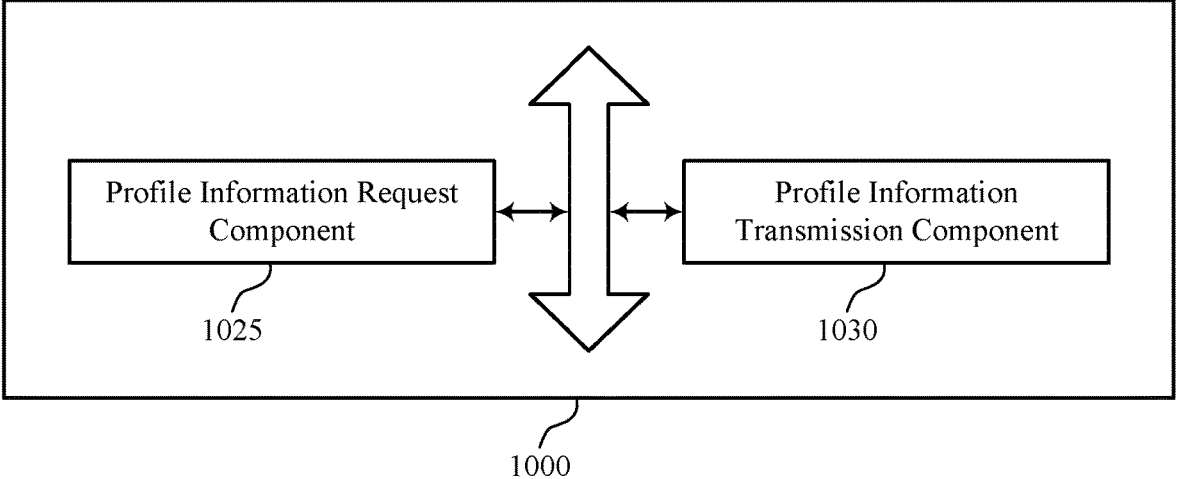

FIG. 10 shows a block diagram of an example wireless communication device 1000 that supports multi-link probing enhancements for more seamless roaming. In some examples, the wireless communication device 1000 is configured to perform the process 1200 described with reference to FIG. 12. The wireless communication device 1000 may include one or more chips, SoCs, chipsets, packages, components or devices that individually or collectively constitute or include a processing system. The processing system may interface with other components of the wireless communication device 1000, and may generally process information (such as inputs or signals) received from such other components and output information (such as outputs or signals) to such other components. In some aspects, an example chip may include a processing system, a first interface to output or transmit information and a second interface to receive or obtain information. For example, the first interface may refer to an interface between the processing system of the chip and a transmission component, such that the wireless communication device 1000 may transmit the information output from the chip. In such an example, the second interface may refer to an interface between the processing system of the chip and a reception component, such that the wireless communication device 1000 may receive information that is then passed to the processing system. In some such examples, the first interface also may obtain information, such as from the transmission component, and the second interface also may output information, such as to the reception component.

The processing system of the wireless communication device 1000 includes processor (or "processing") circuitry in the form of one or multiple processors, microprocessors, processing units (such as central processing units (CPUs), graphics processing units (GPUs) or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. The processing system may further include memory circuitry in the form of one or more memory devices, memory blocks, memory elements or other discrete gate or transistor logic or circuitry, each of which may include tangible storage media such as random-access memory (RAM) or ROM, or combinations thereof (all of which may be generally referred to herein individually as "memories" or collectively as "the memory" or "the memory circuitry."). One or more of the memories may be coupled with one or more of the processors and may individually or collectively store processor-executable code that, when executed by one or more of the processors, may configure one or more of the processors to perform various functions or operations described herein. Additionally, or alternatively, in some examples, one or more of the processors may be preconfigured to perform various functions or operations described herein without requiring configuration by software. The processing system may further include or be coupled with one or more modems (such as a Wi-Fi (such as IEEE compliant) modem or a cellular (such as 3GPP 4G LTE, 5G or 6G compliant) modem). In some implementations, one or more processors of the processing system include or implement one or more of the modems. The processing system may further include or be coupled with multiple radios (collectively "the radio"), multiple RF chains or multiple transceivers, each of which may in turn be coupled with one or more of multiple antennas. In some implementations, one or more processors of the processing system include or implement one or more of the radios, RF chains or transceivers.

In some examples, the wireless communication device 1000 can configurable or configured for use in an AP, such as the AP 102 described with reference to FIG. 1. In some other examples, the wireless communication device 1000 can be an AP that includes such a processing system and other components including multiple antennas. The wireless communication device 1000 is capable of transmitting and receiving wireless communications in the form of, for example, wireless packets. For example, the wireless communication device 1000 can be configurable or configured to transmit and receive packets in the form of physical layer PPDUs and MPDUs conforming to one or more of the IEEE 802.11 family of wireless communication protocol standards. In some other examples, the wireless communication device 1000 can be configurable or configured to transmit and receive signals and communications conforming to one or more 3GPP specifications including those for 5G NR or 6G. In some examples, the wireless communication device 1000 also includes or can be coupled with one or more application processors which may be further coupled with one or more other memories. In some examples, the wireless communication device 1000 further includes at least one external network interface coupled with the processing system that enables communication with a core network or backhaul network that enables the wireless communication device 1000 to gain access to external networks including the Internet.

The wireless communication device 1000 includes a profile information request component 1025 and a profile information transmission component 1030. Portions of one or more of the profile information request component 1025 and the profile information transmission component 1030 may be implemented at least in part in hardware or firmware. For example, one or more of the profile information request component 1025 and the profile information transmission component 1030 may be implemented at least in part by at least a processor or a modem. In some examples, portions of one or more of the profile information request component 1025 and the profile information transmission component 1030 may be implemented at least in part by a processor and software in the form of processor-executable code stored in memory.

The wireless communication device 1000 may support wireless communication in accordance with examples as disclosed herein. The profile information request component 1025 is configurable or configured to receive a first frame indicating, via a multi-link element of the first frame, a request for profile information associated with a set of multiple AP multi-link devices (MLDs). The profile information transmission component 1030 is configurable or configured to transmit, in association with receiving the first frame, a second frame indicating, via one or more multi-link elements of the second frame, at least a portion of the profile information associated with the set of multiple AP MLDs.

In some examples, to support receiving the request for the profile information associated with the set of multiple AP MLDs, the profile information request component 1025 is configurable or configured to receive, via a link info field of the multi-link element of the first frame, a set of multiple per-MLD profile subelements associated with the set of multiple AP MLDs, where a presence of each respective per-MLD profile subelement of the set of multiple per-MLD profile subelements indicates a request for respective profile information associated with a respective AP MLD of the set of multiple AP MLDs.

In some examples, to support receiving the set of multiple per-MLD profile subelements in the link info field, the profile information request component 1025 is configurable or configured to receive, via the link info field, a first per-MLD profile subelement associated with a first AP MLD indicating a request for first profile information associated with the first AP MLD, the first per-MLD profile subelement including at least a first MLD control field and a first MLD info field.

In some examples, the first MLD control field include a first AP MLD identifier subfield identifying the first AP MLD.

In some examples, a first MLD profile field of the first per-MLD profile subelement include one or more first per-station (STA) profile subelements or is absent of first per-STA profile subelements. In some examples, inclusion of the one or more first per-STA profile subelements in the first MLD profile field indicate a request for STA-specific profile information associated with each of one or more first APs affiliated with the first AP MLD that are identified by the one or more first per-STA profile subelements. In some examples, absence of the first per-STA profile subelements from the first MLD profile field indicate a request for STA-specific profile information associated with all APs affiliated with the first AP MLD.

In some examples, a first indication in the first MLD control field indicate whether first MLD-level common information is exclusively requested for the first AP MLD.

In some examples, the profile information request component 1025 is configurable or configured to receive, via a multi-link control field or a common info field of the multi-link element of the first frame, an indication of whether the profile information requested by the first frame includes MLD-level profile information or link-level profile information.

In some examples, per-MLD profile subelements be absent from a link info field of the multi-link element of the first frame. In some examples, an absence of the per-MLD profile subelements indicate a request for profile information associated with all AP MLDs in a candidate AP set.

In some examples, to support receiving the request for the profile information associated with the set of multiple AP MLDs, the profile information request component 1025 is configurable or configured to receive, via a common info field of the multi-link element of the first frame, a list of the set of multiple AP MLDs, where a presence of the list of the set of multiple AP MLDs in the common info field indicates the request for the profile information associated with the set of multiple AP MLDs.

In some examples, the profile information request component 1025 is configurable or configured to receive, via a multi-link control field of the multi-link element of the first frame, an indication of a presence of an AP MLD identifier list subfield including the list of the set of multiple AP MLDs in the common info field.

In some examples, an initial entry in an AP MLD identifier list subfield include the list of the set of multiple AP MLDs provides an indication of a length of the AP MLD identifier list subfield.

In some examples, the profile information request component 1025 is configurable or configured to receive, via a field of the common info field, an indication of a length of an AP MLD identifier list subfield including the list of the set of multiple AP MLDs.

In some examples, the field may be a dedicated field associated with indicating the length of the AP MLD identifier list subfield or an AP MLD identifier subfield. In some examples, the AP MLD identifier subfield be used to indicate the length of the AP MLD identifier list subfield in accordance with the AP MLD identifier list subfield being present in the common info field.

In some examples, to support receiving the request for the profile information associated with the set of multiple AP MLDs, the profile information request component 1025 is configurable or configured to receive, via a link info field of the multi-link element of the first frame, a list of the set of multiple AP MLDs, where a presence of the list of the set of multiple AP MLDs in the link info field indicates the request for the profile information associated with the set of multiple AP MLDs.

In some examples, a link identifier subfield of a per-station (STA) profile subelement including the list of the set of multiple AP MLDs is set to a value to indicate that the per-STA profile subelement includes the list of the set of multiple AP MLDs and indicates the request for the profile information associated with the set of multiple AP MLDs.

In some examples, the profile information request component 1025 is configurable or configured to receive, via a STA control subfield of the per-STA profile subelement, an indication of a presence of an AP MLD identifier list subfield including the list of the set of multiple AP MLDs in the per-STA profile subelement.

In some examples, a subfield of the per-STA profile subelement indicate whether a complete profile of the set of multiple AP MLDs or a partial profile of the set of multiple AP MLDs is requested.

In some examples, an initial entry in an AP MLD identifier list subfield include the list of the set of multiple AP MLDs provides an indication of a length of the AP MLD identifier list subfield.

In some examples, the profile information request component 1025 is configurable or configured to receive, via a subfield of a STA info field of the per-STA profile subelement, an indication of a length of an AP MLD identifier list subfield including the list of the set of multiple AP MLDs.

In some examples, the profile information request component 1025 is configurable or configured to receive, via a subfield of a STA control field of the per-STA profile subelement, an indication of a length of an AP MLD identifier list subfield including the list of the set of multiple AP MLDs.

In some examples, to support transmitting at least the portion of the profile information associated with the set of multiple AP MLDs, the profile information transmission component 1030 is configurable or configured to transmit, via a link info field of a second multi-link element of the second frame, a set of multiple per-MLD profile subelements associated with the set of multiple AP MLDs, where each respective per-MLD profile subelement of the set of multiple per-MLD profile subelements provides respective profile information associated with a respective AP MLD of the set of multiple AP MLDs, and where the one or more multi-link elements of the second frame include the second multi-link element.

In some examples, the link info field of the second multi-link element include a first per-MLD profile subelement providing first profile information associated with a first AP MLD of the set of multiple AP MLDs, the first per-MLD profile subelement including at least a first MLD control field and a first MLD info field.

In some examples, the first MLD control field include a first AP MLD identifier subfield identifying the first AP MLD, and the first MLD info field includes first MLD-level common information associated with the first AP MLD.

In some examples, a first MLD profile field of the first per-MLD profile subelement include one or more first per-station (STA) profile subelements, each first per-STA profile subelement of the one or more first per-STA profile subelements providing respective profile information associated with a respective AP affiliated with the first AP MLD.

In some examples, to support transmitting at least the portion of the profile information associated with the set of multiple AP MLDs, the profile information transmission component 1030 is configurable or configured to transmit, via the link info field of the multi-link element of the first frame, a set of multiple per-station (STA) profile subelements associated with the set of multiple AP MLDs, where each respective per-STA profile subelement of the set of multiple per-STA profile subelements provides respective profile information associated with a respective AP affiliated with a respective AP MLD of the set of multiple AP MLDs.

In some examples, to support transmitting at least the portion of the profile information associated with the set of multiple AP MLDs, the profile information transmission component 1030 is configurable or configured to transmit a set of multiple multi-link elements via the second frame, where each multi-link element of the set of multiple multi-link elements provides respective profile information associated with a respective AP MLD of the set of multiple AP MLDs, and where the one or more multi-link elements of the second frame include the set of multiple multi-link elements.

In some examples, to support transmitting at least the portion of the profile information associated with the set of multiple AP MLDs, the profile information transmission component 1030 is configurable or configured to transmit, via a first multi-link element of the second frame, first profile information associated with a first AP MLD, where the wireless communication is the first AP MLD. In some examples, to support transmitting at least the portion of the profile information associated with the set of multiple AP MLDs, the profile information transmission component 1030 is configurable or configured to transmit, via a link info field of a second multi-link element of the second frame, a set of multiple per-MLD profile subelements providing the profile information associated with the plurality AP MLDs, where each respective per-MLD profile subelement of the set of multiple per-MLD profile subelements provides respective profile information associated with a respective AP MLD of the set of multiple AP MLDs, and where the one or more multi-link elements of the second frame include the second multi-link element.

In some examples, to support transmitting at least the portion of the profile information associated with the set of multiple AP MLDs, the profile information transmission component 1030 is configurable or configured to transmit, via a common info field of at least one multi-link element of the one or more multi-link elements, information that is associated with a grouping of the set of multiple AP MLDs.

In some examples, to support transmitting at least the portion of the profile information associated with the set of multiple AP MLDs, the profile information transmission component 1030 is configurable or configured to transmit, via the second frame, an indication that additional profile information associated with the set of multiple AP MLDs not included in the second frame is forthcoming via one or more additional frames. In some examples, to support transmitting at least the portion of the profile information associated with the set of multiple AP MLDs, the profile information transmission component 1030 is configurable or configured to transmit, via the second frame, an indication that additional profile information associated with the set of multiple AP MLDs not included in the second frame is available upon further request by the wireless communication device.

In some examples, the first frame be a probe request frame and the second frame is a probe response frame.

FIG. 11 shows a flowchart illustrating an example process 1100 performable by or at a wireless communication device that supports multi-link probing enhancements for more seamless roaming. The operations of the process 1100 may be implemented by a wireless communication device or its components as described herein. For example, the process 1100 may be performed by a wireless communication device, such as the wireless communication device 900 described with reference to FIG. 9, operating as or within a wireless STA. In some examples, the process 1100 may be performed by a wireless STA, such as one of the STAs 104 described with reference to FIG. 1.

In some examples, in block 1105, the wireless communication device may transmit a first frame indicating, via a multi-link element of the first frame, a request for profile information associated with a set of multiple AP MLDs. The operations of block 1105 may be performed in accordance with examples as disclosed herein. In some implementations, aspects of the operations of block 1105 may be performed by a profile information request component 925 as described with reference to FIG. 9.

In some examples, in block 1110, the wireless communication device may receive, in association with transmitting the first frame, a second frame indicating, via one or more multi-link elements of the second frame, at least a portion of the profile information associated with the set of multiple AP MLDs. The operations of block 1110 may be performed in accordance with examples as disclosed herein. In some implementations, aspects of the operations of block 1110 may be performed by a profile information reception component 930 as described with reference to FIG. 9.

FIG. 12 shows a flowchart illustrating an example process 1200 performable by or at a wireless communication device that supports multi-link probing enhancements for more seamless roaming. The operations of the process 1200 may be implemented by a wireless communication device or its components as described herein. For example, the process 1200 may be performed by a wireless communication device, such as the wireless communication device 1000 described with reference to FIG. 10, operating as or within a wireless AP. In some examples, the process 1200 may be performed by a wireless AP, such as one of the APs 102 described with reference to FIG. 1.

In some examples, in block 1205, the wireless communication device may receive a first frame indicating, via a multi-link element of the first frame, a request for profile information associated with a set of multiple AP MLDs. The operations of block 1205 may be performed in accordance with examples as disclosed herein. In some implementations, aspects of the operations of block 1205 may be performed by a profile information request component 1025 as described with reference to FIG. 10.

In some examples, in block 1210, the wireless communication device may transmit, in association with receiving the first frame, a second frame indicating, via one or more multi-link elements of the second frame, at least a portion of the profile information associated with the set of multiple AP MLDs. The operations of block 1210 may be performed in accordance with examples as disclosed herein. In some implementations, aspects of the operations of block 1210 may be performed by a profile information transmission component 1030 as described with reference to FIG. 10.

Implementation examples are described in the following numbered clauses:

Clause 1: A method for wireless communication by a wireless communication device, including: transmitting a first frame indicating, via a multi-link element of the first frame, a request for profile information associated with a plurality of AP multi-link devices (MLDs); and receiving, in association with transmitting the first frame, a second frame indicating, via one or more multi-link elements of the second frame, at least a portion of the profile information associated with the plurality of AP MLDs.

Clause 2: The method of clause 1, further including: including, in a link info field of the multi-link element of the first frame, a plurality of per-MLD profile subelements associated with the plurality of AP MLDs, where a presence of each respective per-MLD profile subelement of the plurality of per-MLD profile subelements indicates a request for respective profile information associated with a respective AP MLD of the plurality of AP MLDs.

Clause 3: The method of clause 2, where including the plurality of per-MLD profile subelements in the link info field includes: including a first per-MLD profile subelement associated with a first AP MLD in the link info field to indicate a request for first profile information associated with the first AP MLD, the first per-MLD profile subelement including at least a first MLD control field and a first MLD info field.

Clause 4: The method of clause 3, where the first MLD control field includes a first AP MLD identifier subfield identifying the first AP MLD.

Clause 5: The method of any of clauses 3-4, where a first MLD profile field of the first per-MLD profile subelement includes one or more first per-station (STA) profile subelements or is absent of first per-STA profile subelements, inclusion of the one or more first per-STA profile subelements in the first MLD profile field indicates a request for STA-specific profile information associated with each of one or more first APs affiliated with the first AP MLD that are identified by the one or more first per-STA profile subelements, and absence of the first per-STA profile subelements from the first MLD profile field indicates a request for STA-specific profile information associated with all APs affiliated with the first AP MLD.

Clause 6: The method of any of clauses 3-5, where a first indication in the first MLD control field indicates whether first MLD-level common information is exclusively requested for the first AP MLD.

Clause 7: The method of any of clauses 1-6, further including: including, in a multi-link control field or a common info field of the multi-link element of the first frame, an indication of whether the profile information requested by the first frame includes MLD-level profile information or link-level profile information.

Clause 8: The method of clause 1, further including: excluding per-MLD profile subelements from a link info field of the multi-link element of the first frame, where an absence of the per-MLD profile subelements indicates a request for profile information associated with all AP MLDs in a candidate AP set.

Clause 9: The method of any of clauses 1-8, further including: including, in a common info field of the multi-link element of the first frame, a list of the plurality of AP MLDs, where a presence of the list of the plurality of AP MLDs in the common info field indicates the request for the profile information associated with the plurality of AP MLDs.

Clause 10: The method of clause 9, further including: including, in a multi-link control field of the multi-link element of the first frame, an indication of a presence of an AP MLD identifier list subfield including the list of the plurality of AP MLDs in the common info field.

Clause 11: The method of any of clauses 9-10, further including: including, as an initial entry in an AP MLD identifier list subfield including the list of the plurality of AP MLDs, an indication of a length of the AP MLD identifier list subfield.

Clause 12: The method of any of clauses 9-10, further including: including, in a field of the common info field, an indication of a length of an AP MLD identifier list subfield including the list of the plurality of AP MLDs.

Clause 13: The method of clause 12, where the field is a dedicated field associated with indicating the length of the AP MLD identifier list subfield or an AP MLD identifier subfield, the AP MLD identifier subfield is used to indicate the length of the AP MLD identifier list subfield in accordance with the AP MLD identifier list subfield being present in the common info field.

Clause 14: The method of any of clauses 1-13, further including: including, in a link info field of the multi-link element of the first frame, a list of the plurality of AP MLDs, where a presence of the list of the plurality of AP MLDs in the link info field indicates the request for the profile information associated with the plurality of AP MLDs.

Clause 15: The method of clause 14, further including: setting a link identifier subfield of a per-station (STA) profile subelement including the list of the plurality of AP MLDs to a value to indicate that the per-STA profile subelement includes the list of the plurality of AP MLDs and indicates the request for the profile information associated with the plurality of AP MLDs.

Clause 16: The method of clause 15, further including: including, in a STA control subfield of the per-STA profile subelement, an indication of a presence of an AP MLD identifier list subfield including the list of the plurality of AP MLDs in the per-STA profile subelement.

Clause 17: The method of any of clauses 15-16, where a subfield of the per-STA profile subelement indicates whether a complete profile of the plurality of AP MLDs or a partial profile of the plurality of AP MLDs is requested.

Clause 18: The method of any of clauses 15-17, further including: including, as an initial entry in an AP MLD identifier list subfield including the list of the plurality of AP MLDs, an indication of a length of the AP MLD identifier list subfield.

Clause 19: The method of any of clauses 15-17, further including: including, in a subfield of a STA info field of the per-STA profile subelement, an indication of a length of an AP MLD identifier list subfield including the list of the plurality of AP MLDs.

Clause 20: The method of any of clauses 15-17, further including: including, in a subfield of a STA control field of the per-STA profile subelement, an indication of a length of an AP MLD identifier list subfield including the list of the plurality of AP MLDs.

Clause 21: The method of any of clauses 1-20, where receiving at least the portion of the profile information associated with the plurality of AP MLDs includes: receiving, via a link info field of a second multi-link element of the second frame, a plurality of per-MLD profile subelements associated with the plurality of AP MLDs, where each respective per-MLD profile subelement of the plurality of per-MLD profile subelements provides respective profile information associated with a respective AP MLD of the plurality of AP MLDs, and where the one or more multi-link elements of the second frame include the second multi-link element.

Clause 22: The method of clause 21, where the link info field of the second multi-link element includes a first per-MLD profile subelement providing first profile information associated with a first AP MLD of the plurality of AP MLDs, the first per-MLD profile subelement including at least a first MLD control field and a first MLD info field.

Clause 23: The method of clause 22, where the first MLD control field includes a first AP MLD identifier subfield identifying the first AP MLD, and the first MLD info field includes first MLD-level common information associated with the first AP MLD.

Clause 24: The method of any of clauses 22-23, where a first MLD profile field of the first per-MLD profile subelement includes one or more first per-station (STA) profile subelements, each first per-STA profile subelement of the one or more first per-STA profile subelements providing respective profile information associated with a respective AP affiliated with the first AP MLD.

Clause 25: The method of any of clauses 21-24, where receiving at least the portion of the profile information associated with the plurality of AP MLDs includes: receiving, via the link info field of the multi-link element of the first frame, a plurality of per-station (STA) profile subelements associated with the plurality of AP MLDs, where each respective per-STA profile subelement of the plurality of per-STA profile subelements provides respective profile information associated with a respective AP affiliated with a respective AP MLD of the plurality of AP MLDs.

Clause 26: The method of any of clauses 1-25, where receiving at least the portion of the profile information associated with the plurality of AP MLDs includes: receiving a plurality of multi-link elements via the second frame, where each multi-link element of the plurality of multi-link elements provides respective profile information associated with a respective AP MLD of the plurality of AP MLDs, and where the one or more multi-link elements of the second frame include the plurality of multi-link elements.

Clause 27: The method of any of clauses 1-26, where receiving at least the portion of the profile information associated with the plurality of AP MLDs includes: receiving, via a first multi-link element of the second frame, first profile information associated with a first AP MLD, where a reporting AP that transmits the second frame is affiliated with the first AP MLD; and receiving, via a link info field of a second multi-link element of the second frame, a plurality of per-MLD profile subelements providing the profile information associated with the plurality AP MLDs, where each respective per-MLD profile subelement of the plurality of per-MLD profile subelements provides respective profile information associated with a respective AP MLD of the plurality of AP MLDs, and where the one or more multi-link elements of the second frame include the second multi-link element.

Clause 28: The method of any of clauses 1-27, where receiving at least the portion of the profile information associated with the plurality of AP MLDs includes: receiving, via a common info field of at least one multi-link element of the one or more multi-link elements, information that is associated with a grouping of the plurality of AP MLDs.

Clause 29: The method of any of clauses 1-28, where receiving at least the portion of the profile information associated with the plurality of AP MLDs includes: receiving, via the second frame, an indication that additional profile information associated with the plurality of AP MLDs not included in the second frame is forthcoming via one or more additional frames: or receiving, via the second frame, an indication that additional profile information associated with the plurality of AP MLDs not included in the second frame is available upon further request by the wireless communication device.

Clause 30: The method of any of clauses 1-29, further including: associating with a first MLD of the plurality of MLDs in accordance with the profile information associated with the plurality of MLDs, where association with the first MLD is in accordance with a roaming procedure at the wireless communication device.

Clause 31: The method of clause 30, where the second frame is received from a second MLD, the second MLD being different from the first MLD.

Clause 32: The method of any of clauses 1-31, where the first frame is a probe request frame and the second frame is a probe response frame.

Clause 33: A method for wireless communication by a wireless communication device, including: receiving a first frame indicating, via a multi-link element of the first frame, a request for profile information associated with a plurality of AP multi-link devices (MLDs); and transmitting, in association with receiving the first frame, a second frame indicating, via one or more multi-link elements of the second frame, at least a portion of the profile information associated with the plurality of AP MLDs.

Clause 34: The method of clause 33, where receiving the request for the profile information associated with the plurality of AP MLDs includes: receiving, via a link info field of the multi-link element of the first frame, a plurality of per-MLD profile subelements associated with the plurality of AP MLDs, where a presence of each respective per-MLD profile subelement of the plurality of per-MLD profile subelements indicates a request for respective profile information associated with a respective AP MLD of the plurality of AP MLDs.

Clause 35: The method of clause 34, where receiving the plurality of per-MLD profile subelements in the link info field includes: receiving, via the link info field, a first per-MLD profile subelement associated with a first AP MLD indicating a request for first profile information associated with the first AP MLD, the first per-MLD profile subelement including at least a first MLD control field and a first MLD info field.

Clause 36: The method of clause 35, where the first MLD control field includes a first AP MLD identifier subfield identifying the first AP MLD.

Clause 37: The method of any of clauses 35-36, where a first MLD profile field of the first per-MLD profile subelement includes one or more first per-station (STA) profile subelements or is absent of first per-STA profile subelements, inclusion of the one or more first per-STA profile subelements in the first MLD profile field indicates a request for STA-specific profile information associated with each of one or more first APs affiliated with the first AP MLD that are identified by the one or more first per-STA profile subelements, and absence of the first per-STA profile subelements from the first MLD profile field indicates a request for STA-specific profile information associated with all APs affiliated with the first AP MLD.

Clause 38: The method of any of clauses 35-37, where a first indication in the first MLD control field indicates whether first MLD-level common information is exclusively requested for the first AP MLD.

Clause 39: The method of any of clauses 33-38, further including: receiving, via a multi-link control field or a common info field of the multi-link element of the first frame, an indication of whether the profile information requested by the first frame includes MLD-level profile information or link-level profile information.

Clause 40: The method of clause 33, where per-MLD profile subelements are absent from a link info field of the multi-link element of the first frame, an absence of the per-MLD profile subelements indicates a request for profile information associated with all AP MLDs in a candidate AP set.

Clause 41: The method of any of clauses 33-40, where receiving the request for the profile information associated with the plurality of AP MLDs includes: receiving, via a common info field of the multi-link element of the first frame, a list of the plurality of AP MLDs, where a presence of the list of the plurality of AP MLDs in the common info field indicates the request for the profile information associated with the plurality of AP MLDs.

Clause 42: The method of clause 41, further including: receiving, via a multi-link control field of the multi-link element of the first frame, an indication of a presence of an AP MLD identifier list subfield including the list of the plurality of AP MLDs in the common info field.

Clause 43: The method of any of clauses 41-42, where an initial entry in an AP MLD identifier list subfield including the list of the plurality of AP MLDs provides an indication of a length of the AP MLD identifier list subfield.

Clause 44: The method of any of clauses 41-42, further including: receiving, via a field of the common info field, an indication of a length of an AP MLD identifier list subfield including the list of the plurality of AP MLDs.

Clause 45: The method of clause 44, where the field is a dedicated field associated with indicating the length of the AP MLD identifier list subfield or an AP MLD identifier subfield, the AP MLD identifier subfield is used to indicate the length of the AP MLD identifier list subfield in accordance with the AP MLD identifier list subfield being present in the common info field.

Clause 46: The method of any of clauses 33-45, where receiving the request for the profile information associated with the plurality of AP MLDs includes: receiving, via a link info field of the multi-link element of the first frame, a list of the plurality of AP MLDs, where a presence of the list of the plurality of AP MLDs in the link info field indicates the request for the profile information associated with the plurality of AP MLDs.

Clause 47: The method of clause 46, where a link identifier subfield of a per-station (STA) profile subelement including the list of the plurality of AP MLDs is set to a value to indicate that the per-STA profile subelement includes the list of the plurality of AP MLDs and indicates the request for the profile information associated with the plurality of AP MLDs.

Clause 48: The method of clause 47, further including: receiving, via a STA control subfield of the per-STA profile subelement, an indication of a presence of an AP MLD identifier list subfield including the list of the plurality of AP MLDs in the per-STA profile subelement.

Clause 49: The method of any of clauses 47-48, where a subfield of the per-STA profile subelement indicates whether a complete profile of the plurality of AP MLDs or a partial profile of the plurality of AP MLDs is requested.

Clause 50: The method of any of clauses 47-49, where an initial entry in an AP MLD identifier list subfield including the list of the plurality of AP MLDs provides an indication of a length of the AP MLD identifier list subfield.

Clause 51: The method of any of clauses 47-49, further including: receiving, via a subfield of a STA info field of the per-STA profile subelement, an indication of a length of an AP MLD identifier list subfield including the list of the plurality of AP MLDs.

Clause 52: The method of any of clauses 47-49, further including: receiving, via a subfield of a STA control field of the per-STA profile subelement, an indication of a length of an AP MLD identifier list subfield including the list of the plurality of AP MLDs.

Clause 53: The method of any of clauses 33-52, where transmitting at least the portion of the profile information associated with the plurality of AP MLDs includes: transmitting, via a link info field of a second multi-link element of the second frame, a plurality of per-MLD profile subelements associated with the plurality of AP MLDs, where each respective per-MLD profile subelement of the plurality of per-MLD profile subelements provides respective profile information associated with a respective AP MLD of the plurality of AP MLDs, and where the one or more multi-link elements of the second frame include the second multi-link element.

Clause 54: The method of clause 53, where the link info field of the second multi-link element includes a first per-MLD profile subelement providing first profile information associated with a first AP MLD of the plurality of AP MLDs, the first per-MLD profile subelement including at least a first MLD control field and a first MLD info field.

Clause 55: The method of clause 54, where the first MLD control field includes a first AP MLD identifier subfield identifying the first AP MLD, and the first MLD info field includes first MLD-level common information associated with the first AP MLD.

Clause 56: The method of any of clauses 54-55, where a first MLD profile field of the first per-MLD profile subelement includes one or more first per-station (STA) profile subelements, each first per-STA profile subelement of the one or more first per-STA profile subelements providing respective profile information associated with a respective AP affiliated with the first AP MLD.

Clause 57: The method of any of clauses 53-56, where transmitting at least the portion of the profile information associated with the plurality of AP MLDs includes: transmitting, via the link info field of the multi-link element of the first frame, a plurality of per-station (STA) profile subelements associated with the plurality of AP MLDs, where each respective per-STA profile subelement of the plurality of per-STA profile subelements provides respective profile information associated with a respective AP affiliated with a respective AP MLD of the plurality of AP MLDs.

Clause 58: The method of any of clauses 33-57, where transmitting at least the portion of the profile information associated with the plurality of AP MLDs includes: transmitting a plurality of multi-link elements via the second frame, where each multi-link element of the plurality of multi-link elements provides respective profile information associated with a respective AP MLD of the plurality of AP MLDs, and where the one or more multi-link elements of the second frame include the plurality of multi-link elements.

Clause 59: The method of any of clauses 33-58, where transmitting at least the portion of the profile information associated with the plurality of AP MLDs includes: transmitting, via a first multi-link element of the second frame, first profile information associated with a first AP MLD, where the wireless communication is the first AP MLD; and transmitting, via a link info field of a second multi-link element of the second frame, a plurality of per-MLD profile subelements providing the profile information associated with the plurality AP MLDs, where each respective per-MLD profile subelement of the plurality of per-MLD profile subelements provides respective profile information associated with a respective AP MLD of the plurality of AP MLDs, and where the one or more multi-link elements of the second frame include the second multi-link element.

Clause 60: The method of any of clauses 33-59, where transmitting at least the portion of the profile information associated with the plurality of AP MLDs includes: transmitting, via a common info field of at least one multi-link element of the one or more multi-link elements, information that is associated with a grouping of the plurality of AP MLDs.

Clause 61: The method of any of clauses 33-60, where transmitting at least the portion of the profile information associated with the plurality of AP MLDs includes: transmitting, via the second frame, an indication that additional profile information associated with the plurality of AP MLDs not included in the second frame is forthcoming via one or more additional frames; or transmitting, via the second frame, an indication that additional profile information associated with the plurality of AP MLDs not included in the second frame is available upon further request by the wireless communication device.

Clause 62: The method of any of clauses 33-61, where the first frame is a probe request frame and the second frame is a probe response frame.

Clause 63: A wireless communication device, including a processing system that includes processor circuitry and memory circuitry that stores code, the processing system configured to cause the wireless communication device to perform a method of any of clauses 1-32.

Clause 64: A wireless communication device for wireless communication, including at least one means for performing a method of any of clauses 1-32.

Clause 65: A non-transitory computer-readable medium storing code for wireless communication, the code including instructions executable by one or more processors to perform a method of any of clauses 1-32.

Clause 66: A wireless communication device for wireless communication, including a processing system that includes processor circuitry and memory circuitry that stores code, the processing system configured to cause the wireless communication device to perform a method of any of clauses 33-62.

Clause 67: A wireless communication device for wireless communication, including at least one means for performing a method of any of clauses 33-62.

Clause 68: A non-transitory computer-readable medium storing code for wireless communication, the code including instructions executable by one or more processors to perform a method of any of clauses 33-62.

As used herein, the term "determine" or "determining" encompasses a wide variety of actions and, therefore, "determining" can include calculating, computing, processing, deriving, estimating, investigating, looking up (such as via looking up in a table, a database, or another data structure), inferring, ascertaining, or measuring, among other possibilities. Also, "determining" can include receiving (such as receiving information), accessing (such as accessing data stored in memory) or transmitting (such as transmitting information), among other possibilities. Additionally, "determining" can include resolving, selecting, obtaining, choosing, establishing and other such similar actions.

As used herein, a phrase referring to "at least one of" or "one or more of" a list of items refers to any combination of those items, including single members. As an example, "at least one of: a, b, or c" is intended to cover: a, b, c, a-b, a-c, b-c, and a-b-c. As used herein, "or" is intended to be interpreted in the inclusive sense, unless otherwise explicitly indicated. For example, "a or b" may include a only, b only, or a combination of a and b. Furthermore, as used herein, a phrase referring to "a" or "an" element refers to one or more of such elements acting individually or collectively to perform the recited function(s). Additionally, a "set" refers to one or more items, and a "subset" refers to less than a whole set, but non-empty.

As used herein, "based on" is intended to be interpreted in the inclusive sense, unless otherwise explicitly indicated. For example, "based on" may be used interchangeably with "based at least in part on," "associated with," "in association with," or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions, or information.

The various illustrative components, logic, logical blocks, modules, circuits, operations, and algorithm processes described in connection with the examples disclosed herein may be implemented as electronic hardware, firmware, software, or combinations of hardware, firmware, or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the examples described in this disclosure may be readily apparent to persons having ordinary skill in the art, and the generic principles defined herein may be applied to other examples without departing from the spirit or scope of this disclosure. Thus, the claims are not intended to be limited to the examples shown herein, but are to be accorded the widest scope consistent with this disclosure, the principles and the novel features disclosed herein.

Additionally, various features that are described in this specification in the context of separate examples also can be implemented in combination in a single implementation. Conversely, various features that are described in the context of a single implementation also can be implemented in multiple examples separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

What is claimed is:

1. A wireless communication device, comprising:
a processing system that includes processor circuitry and memory circuitry that stores code, the processing system configured to cause the wireless communication device to:
    transmit a first frame indicating a request for profile information associated with one or more access point (AP) multi-link devices (MLDs) included in an AP MLD group;
    receive, in association with transmitting the first frame, a second frame indicating, via one or more multi-link elements of the second frame, at least a portion of the profile information associated with the one or more AP MLDs; and
    roam, based at least in part on at least the portion of the profile information indicated by the second frame, from a first AP MLD of the AP MLD group to a second AP MLD of the AP MLD group in accordance with a context transfer between the first AP MLD and the second AP MLD, wherein the context transfer between the first AP MLD and the second AP MLD is in accordance with the first AP MLD and the second AP MLD being included in the AP MLD group.

2. The wireless communication device of claim 1, wherein the processing system is further configured to cause the wireless communication device to:
    include, in a link info field of a multi-link element of the first frame, a plurality of per-MLD profile subelements associated with a plurality of AP MLDs, the plurality of AP MLDs comprising the one or more AP MLDs, wherein a presence of each respective per-MLD profile subelement of the plurality of per-MLD profile subelements indicates a request for respective profile information associated with a respective AP MLD of the plurality of AP MLDs.

3. The wireless communication device of claim 2, wherein, to include the plurality of per-MLD profile subelements in the link info field, the processing system is configured to cause the wireless communication device to:
    include a first per-MLD profile subelement associated with the second AP MLD in the link info field to indicate a request for first profile information associated with the second AP MLD, the first per-MLD profile subelement including at least a first MLD control field and a first MLD info field.

4. The wireless communication device of claim 3, wherein the first MLD control field includes a first AP MLD identifier subfield identifying the second AP MLD.

5. The wireless communication device of claim 3, wherein:

a first MLD profile field of the first per-MLD profile subelement includes one or more first per-station (STA) profile subelements or is absent of first per-STA profile subelements, and wherein inclusion of the one or more first per-STA profile subelements in the first MLD profile field indicates a request for STA-specific profile information associated with each of one or more first APs affiliated with the second AP MLD that are identified by the one or more first per-STA profile subelements, and wherein an absence of the first per-STA profile subelements from the first MLD profile field indicates a request for STA-specific profile information associated with all APs affiliated with the second AP MLD.

6. The wireless communication device of claim 3, wherein a first indication in the first MLD control field indicates whether first MLD-level common information is exclusively requested for the second AP MLD.

7. The wireless communication device of claim 1, wherein the processing system is further configured to cause the wireless communication device to:

include, in a multi-link control field or a common info field of a multi-link element of the first frame, an indication of whether the profile information requested by the first frame includes MLD-level profile information or link-level profile information.

8. The wireless communication device of claim 1, wherein the processing system is further configured to cause the wireless communication device to:

exclude per-MLD profile subelements from a link info field of a multi-link element of the first frame, wherein an absence of the per-MLD profile subelements indicates a request for profile information associated with all AP MLDs in a candidate AP set.

9. The wireless communication device of claim 1, wherein the processing system is further configured to cause the wireless communication device to:

include, in a common info field of a multi-link element of the first frame, a list of the one or more AP MLDs, wherein a presence of the list of the one or more AP MLDs in the common info field indicates the request for the profile information associated with the one or more AP MLDs.

10. The wireless communication device of claim 9, wherein the processing system is further configured to cause the wireless communication device to:

include, in a multi-link control field of the multi-link element of the first frame, an indication of a presence of an AP MLD identifier list subfield including the list of the one or more AP MLDs in the common info field.

11. The wireless communication device of claim 9, wherein the processing system is further configured to cause the wireless communication device to:

include, as an initial entry in an AP MLD identifier list subfield including the list of the one or more AP MLDs, an indication of a length of the AP MLD identifier list subfield.

12. The wireless communication device of claim 9, wherein the processing system is further configured to cause the wireless communication device to:

include, in a field of the common info field, an indication of a length of an AP MLD identifier list subfield including the list of the one or more AP MLDs.

13. The wireless communication device of claim 12, wherein:

the field is a dedicated field associated with indicating the length of the AP MLD identifier list subfield or an AP MLD identifier subfield; or the AP MLD identifier subfield is used to indicate the length of the AP MLD identifier list subfield in accordance with the AP MLD identifier list subfield being present in the common info field.

14. The wireless communication device of claim 1, wherein the processing system is further configured to cause the wireless communication device to:

include, in a link info field of a multi-link element of the first frame, a list of the one or more AP MLDs, wherein a presence of the list of the one or more AP MLDs in the link info field indicates the request for the profile information associated with the one or more AP MLDs.

15. The wireless communication device of claim 14, wherein the processing system is further configured to cause the wireless communication device to:

set a link identifier subfield of a per-station (STA) profile subelement including the list of the one or more AP MLDs to a value to indicate that the per-STA profile subelement includes the list of the one or more AP MLDs and indicates the request for the profile information associated with the one or more AP MLDs.

16. The wireless communication device of claim 15, wherein the processing system is further configured to cause the wireless communication device to:

include, in a STA control subfield of the per-STA profile subelement, an indication of a presence of an AP MLD identifier list subfield including the list of the one or more AP MLDs in the per-STA profile subelement.

17. The wireless communication device of claim 15, wherein a subfield of the per-STA profile subelement indicates whether a complete profile of the one or more AP MLDs or a partial profile of the one or more AP MLDs is requested.

18. The wireless communication device of claim 15, wherein the processing system is further configured to cause the wireless communication device to:

include, as an initial entry in an AP MLD identifier list subfield including the list of the one or more AP MLDs, an indication of a length of the AP MLD identifier list subfield.

19. The wireless communication device of claim 15, wherein the processing system is further configured to cause the wireless communication device to:

include, in a subfield of a STA info field of the per-STA profile subelement, an indication of a length of an AP MLD identifier list subfield including the list of the one or more AP MLDs.

20. The wireless communication device of claim 15, wherein the processing system is further configured to cause the wireless communication device to:

include, in a subfield of a STA control field of the per-STA profile subelement, an indication of a length of an AP MLD identifier list subfield including the list of the one or more AP MLDs.

21. A first access point (AP) multi-link device (MLD), comprising:

a processing system that includes processor circuitry and memory circuitry that stores code, the processing system configured to cause the first AP MLD to:

receive a first frame indicating a request for profile information associated with one or more AP MLDs included in an AP MLD group;

transmit, in association with receiving the first frame, a second frame indicating, via one or more multi-link elements of the second frame, at least a portion of the profile information associated with the one or more AP MLDs; and perform a context transfer between the first AP MLD and a second AP MLD of the AP MLD group, wherein the context transfer between the first AP MLD and the second AP MLD of the AP MLD group is in accordance with the first AP MLD and the second AP MLD being included in the AP MLD group.

22. The first AP MLD of claim 21, wherein, to transmit at least the portion of the profile information associated with the one or more AP MLDs, the processing system is configured to cause the first AP MLD to:

transmit, via a link info field of a second multi-link element of the second frame, a plurality of per-MLD profile subelements associated with a plurality of AP MLDs, the plurality of AP MLDs comprising the one or more AP MLDs, wherein each respective per-MLD profile subelement of the plurality of per-MLD profile subelements provides respective profile information associated with a respective AP MLD of the plurality of AP MLDs, and wherein the one or more multi-link elements of the second frame comprise the second multi-link element.

23. The first AP MLD of claim 22, wherein the link info field of the second multi-link element includes a first per-MLD profile subelement providing first profile information associated with the second AP MLD of the plurality of AP MLDs, the first per-MLD profile subelement including at least a first MLD control field and a first MLD info field.

24. The first AP MLD of claim 23, wherein the first MLD control field includes a first AP MLD identifier subfield identifying the second AP MLD, and the first MLD info field includes first MLD-level common information associated with the second AP MLD.

25. The first AP MLD of claim 23, wherein a first MLD profile field of the first per-MLD profile subelement includes one or more first per-station (STA) profile subelements, each first per-STA profile subelement of the one or more first per-STA profile subelements providing respective profile information associated with a respective AP affiliated with the second AP MLD.

26. The first AP MLD of claim 22, wherein, to transmit at least the portion of the profile information associated with the one or more AP MLDs, the processing system is configured to cause the first AP MLD to:

transmit, via the link info field of the second multi-link element of the second frame, a plurality of per-station (STA) profile subelements associated with the plurality of AP MLDs, wherein each respective per-STA profile subelement of the plurality of per-STA profile subelements provides respective profile information associated with a respective AP affiliated with a respective AP MLD of the plurality of AP MLDs.

27. The first AP MLD of claim 21, wherein, to transmit at least the portion of the profile information associated with the one or more AP MLDs, the processing system is configured to cause the first AP MLD to:

transmit a plurality of multi-link elements via the second frame, wherein each multi-link element of the plurality of multi-link elements provides respective profile information associated with a respective AP MLD of the one or more AP MLDs, and wherein the one or more multi-link elements of the second frame comprise the plurality of multi-link elements.

28. The first AP MLD of claim 21, wherein, to transmit at least the portion of the profile information associated with the one or more AP MLDs, the processing system is configured to cause the first AP MLD to:

transmit, via a first multi-link element of the second frame, first profile information associated with the first AP MLD; and transmit, via a link info field of a second multi-link element of the second frame, a plurality of per-MLD profile subelements providing the profile information associated with the one or more AP MLDs, wherein each respective per-MLD profile subelement of the plurality of per-MLD profile subelements provides respective profile information associated with a respective AP MLD of the one or more AP MLDs, and wherein the one or more multi-link elements of the second frame comprise the second multi-link element.

29. A method for wireless communication by a wireless communication device, comprising:

transmitting a first frame indicating a request for profile information associated with one or more access point (AP) multi-link devices (MLDs) included in an AP MLD group;

receiving, in association with transmitting the first frame, a second frame indicating, via one or more multi-link elements of the second frame, at least a portion of the profile information associated with the one or more AP MLDs; and roaming, based at least in part on at least the portion of the profile information indicated by the second frame, from a first AP MLD of the AP MLD group to a second AP MLD of the AP MLD group in accordance with a context transfer between the first AP MLD and the second AP MLD, wherein the context transfer between the first AP MLD and the second AP MLD is in accordance with the first AP MLD and the second AP MLD being included in the AP MLD group.

30. A method for wireless communication by a first access point (AP) multi-link device (MLD), comprising:

receiving a first frame indicating a request for profile information associated with one or more AP MLDs included in an AP MLD group;

transmitting, in association with receiving the first frame, a second frame indicating, via one or more multi-link elements of the second frame, at least a portion of the profile information associated with the one or more AP MLDs; and performing a context transfer between the first AP MLD and a second AP MLD of the AP MLD group, wherein the context transfer between the first AP MLD and the second AP MLD of the AP MLD group is in accordance with the first AP MLD and the second AP MLD being included in the AP MLD group.

* * * * *